(12) United States Patent
Frankel et al.

(10) Patent No.: US 9,882,945 B2
(45) Date of Patent: Jan. 30, 2018

(54) MEDIA SHARING COMMUNICATIONS SYSTEM

(71) Applicant: Synacor, Inc., Buffalo, NY (US)

(72) Inventors: Ronald Neil Frankel, Pacific Palisades, CA (US); Jacob Robert Woodward, Hamburg, NY (US)

(73) Assignee: Synacor, Inc., Buffalo, NY (US)

( * ) Notice: Subject to any disclaimer, the term of this patent is extended or adjusted under 35 U.S.C. 154(b) by 470 days.

(21) Appl. No.: 14/033,667

(22) Filed: Sep. 23, 2013

(65) Prior Publication Data

US 2014/0280498 A1 Sep. 18, 2014

Related U.S. Application Data

(60) Provisional application No. 61/781,887, filed on Mar. 14, 2013.

(51) Int. Cl.
*G06F 15/16* (2006.01)
*H04L 29/06* (2006.01)
*G06Q 50/00* (2012.01)
*H04W 4/20* (2009.01)
*H04L 29/08* (2006.01)

(52) U.S. Cl.
CPC ......... *H04L 65/1093* (2013.01); *G06Q 50/01* (2013.01); *H04L 63/102* (2013.01); *H04L 65/4084* (2013.01); *H04L 65/604* (2013.01); *H04W 4/206* (2013.01); *H04L 67/02* (2013.01); *H04L 2463/103* (2013.01)

(58) Field of Classification Search
CPC .................................................. H04W 64/00
USPC ......................................................... 709/203
See application file for complete search history.

(56) References Cited

U.S. PATENT DOCUMENTS 7,925,592 B1\* 4/2011 Issa .......................... G06F 21/10
705/52
2004/0039911 A1\* 2/2004 Oka ........................ G06Q 30/06
713/175

(Continued)

OTHER PUBLICATIONS

Biddle, "Facebook connect goes to the movies," The Facebook Blog [online], Mar 24, 2009 [retrieved on Oct. 1, 2013]. Retrieved from the Internet: <URL: https://blog.facebook.com/blog.php-?post=62329872130>, 2 pages.

(Continued)

*Primary Examiner* — Hamza Algibhah
(74) *Attorney, Agent, or Firm* — Fish & Richardson P.C.

(57) ABSTRACT

A system retrieves media content from a first media content provider for access by a sharing user, and receives an indication that the sharing user desires to share the media content with a receiving user. The system determines an identity of the receiving user and shares the media content by sending an intermediate link that identifies the media content to a computer system of the receiving user. The system receives an indication that the receiving user has selected the intermediate link, and communicates an identity of the media content and the identity of the receiving user to an intermediate server. The system obtains, from the intermediate server, a first universal resource locator (URL) that was determined based on the identity of the media content and the identity of the receiving user. The system retrieves the media content from a second media content provider using the first URL.

27 Claims, 10 Drawing Sheets

(56) References Cited

U.S. PATENT DOCUMENTS

| | | | |
|---|---|---|---|
| 2004/0044779 A1 | 3/2004 | Lambert | |
| 2005/0240588 A1* | 10/2005 | Siegel | G06F 17/30781 |
| 2006/0195479 A1* | 8/2006 | Spiegelman | G06F 17/30766 |
| 2006/0212367 A1* | 9/2006 | Gross | G06Q 30/06 |
| | | | 705/26.1 |
| 2007/0276864 A1 | 11/2007 | Espelien | |
| 2008/0034064 A1 | 2/2008 | Choi et al. | |
| 2008/0049782 A1 | 2/2008 | Nichols et al. | |
| 2008/0075281 A1 | 3/2008 | Zeng | |
| 2008/0127289 A1* | 5/2008 | Julia | H04N 7/17318 |
| | | | 725/109 |
| 2008/0244751 A1* | 10/2008 | Peinado | G06F 21/10 |
| | | | 726/26 |
| 2009/0240693 A1 | 9/2009 | Davidson | |
| 2010/0125511 A1* | 5/2010 | Jouret | G06F 21/10 |
| | | | 705/26.1 |
| 2011/0072078 A1* | 3/2011 | Chai | G06F 17/30044 |
| | | | 709/203 |
| 2011/0143651 A1* | 6/2011 | Marocchi | G08B 27/006 |
| | | | 455/3.06 |
| 2011/0150214 A1* | 6/2011 | Gleim | H04L 9/0822 |
| | | | 380/200 |
| 2011/0202430 A1 | 8/2011 | Narayanan | |
| 2011/0225417 A1* | 9/2011 | Maharajh | G06F 21/10 |
| | | | 713/150 |
| 2012/0011534 A1* | 1/2012 | Mukerji | H04L 63/08 |
| | | | 725/25 |
| 2012/0066386 A1 | 3/2012 | McGowan et al. | |
| 2012/0079606 A1 | 3/2012 | Evans et al. | |
| 2012/0110678 A1* | 5/2012 | Kumble | G06F 21/10 |
| | | | 726/28 |
| 2012/0144308 A1* | 6/2012 | Welingkar | G06Q 30/02 |
| | | | 715/738 |
| 2012/0159337 A1* | 6/2012 | Travilla | G06Q 30/0631 |
| | | | 715/738 |
| 2012/0317288 A1 | 12/2012 | Campana | |
| 2012/0323349 A9 | 12/2012 | Khedouri et al. | |
| 2013/0013698 A1 | 1/2013 | Relyea et al. | |
| 2013/0036155 A1* | 2/2013 | Shaw | 709/202 |
| 2013/0138967 A1* | 5/2013 | Auld | H04L 9/3231 |
| | | | 713/180 |
| 2013/0179949 A1* | 7/2013 | Shapiro | H04L 51/12 |
| | | | 726/4 |
| 2013/0218961 A1* | 8/2013 | Ho | G06Q 30/02 |
| | | | 709/204 |
| 2013/0239003 A1* | 9/2013 | Usenko | G06F 3/0488 |
| | | | 715/733 |
| 2013/0267250 A1* | 10/2013 | Lin | G06F 1/1694 |
| | | | 455/456.3 |
| 2013/0298216 A1 | 11/2013 | Kuznetsov | |
| 2014/0006423 A1* | 1/2014 | Melnychenko | G06F 17/3053 |
| | | | 707/749 |
| 2014/0222910 A1* | 8/2014 | Petersen | G06Q 30/02 |
| | | | 709/204 |
| 2014/0282851 A1 | 9/2014 | Miller et al. | |
| 2015/0193433 A1* | 7/2015 | Dykeman | G06F 17/3056 |
| | | | 707/722 |

OTHER PUBLICATIONS

Ho, "Apple scoops up Matcha.tv to pack more smarts into Apple TV," TechCrunch [online] Aug. 13, 2013 [retrieved Oct. 1, 2013]. Retrieved from the Internet: <URL: http://techcrunch.com/2013/08/13/apple-scoops-up-matcha-tv-to-pack-more-smarts-into-apple-tv/>, 5 pages.

Jolicloud, "Introducing Jolidrive," Jolicloud [online], captured Mar. 7, 2013. Retrieved from the Internet:<URL: http://web.archive.org/web/20130307045457/http://www.jolicloud.com/>, 5 pages.

Jolicloud, "Introducing the new Jolicloud," Jolicloud [online], captured Feb. 25, 2012. Retrieved from the Internet: <URL: http://web.archive.org/web/20120225195656/http://www.jolicloud.com/>, 3 pages.

Matcha, "Video Discovery Experience for Connected Devices," AngelList [online] Summer 2012. Retrieved from the Internet: <URL: https://angel.co/matcha>, 3 pages.

ShowYou, [online], captured Jan. 16, 2013, Retrieved from the Internet: <URL: http://web.archive.org/web/20130116032504/http://showyou.com/>, 7 pages.

ShowYou, [online], captured Mar. 7, 2012. Retrieved from the Internet: < URL: http://web.archive.org/web/20120307003630/http://showyou.com/>, 2 pages.

Sullivan, "Facebook's New News Feed: The Before & After Look," Marketing Land [online], Mar. 7, 2013, [retrieved on Oct. 1, 2013]. Retrieved from the Internet: <URL: http://marketingland.com/facebook-news-feed-the-before-after-35632>, 12 pages.

International Preliminary Report on Patentability for PCT/US2014/024318, dated Sep. 24, 2015, 5 pages.

International Preliminary Report on Patentability for PCT/US2014/024665, dated Sep. 24, 2015, 6 pages.

International Search Report and Written Opinion for PCT/US2014/24318, dated Jul. 29, 2014, 9 pages.

International Search Report and Written Opinion for PCT/US2014/024665, dated Aug. 5, 2014, 10 pages.

European Search Report in Application No. 14779546.2, dated Jul. 18, 2016, 7 pages.

European Search Report in Application No. 14775216.6, dated Jul. 13, 2016, 6 pages.

* cited by examiner

MEDIA SHARING COMMUNICATIONS SYSTEM

CROSS-REFERENCE TO RELATED APPLICATIONS

This application claims the benefit of U.S. Provisional Application No. 61/781,887 filed Mar. 14, 2013 which is incorporated herein by reference in its entirety.

FIELD

This specification describes technologies related to media sharing.

BACKGROUND

Users of cloud-based media may wish to share protected content with each other. Such sharing, however, may pose a digital rights problem because some users with whom protected content is desired to be shared may not have the digital rights to consume the shared content. The digital rights problem that arises due to media sharing of protected content is applicable to a wide range of media content, including video, music, audio, games, applications, images, and documents.

For example, a sharing user may have rights to access a video from a particular media provider or source and may wish to share that video with another user, hereinafter referred to as a receiving user. The receiving user, however, may not have rights to access the video from the media provider of the sharing user, but may instead have rights to access the video from a different media provider. Despite having rights to access the shared video, the receiving user, nevertheless, may be unable to perceive the shared video because the sharing transaction limits access to the shared video to the media provider of the sharing user.

SUMMARY

Techniques are disclosed that address the digital rights problem arising from the sharing of protected media content between users. The techniques enable users to share media in a manner that is content source (or media provider) agnostic. That is, the techniques allow a sending user to select to share with one or more receiving users a piece of media content in a manner that enables the one or more receiving users to access the shared piece of media content from media providers (which also may be referred to herein as media content providers or content providers) that may be different from that used by the sharing user to originally access and perceive the shared piece of media content. In other words, the sharing transaction is no longer tethered to the media provider of the sharing user. In some implementations, the source agnostic sharing of media may be accomplished through use of a communications system that establishes the identity of the content to be shared in a manner that is independent of the content source (e.g., "Episode #425 of Star Trek"), provides an intermediate link specific to that identified content that is selectable by the receiving user to interact with an intermediate server, and enables the receiving user to be redirected, through automated or manual interactions with the intermediate server and based on a rights profile of the receiving user, to a media provider with which the user can interact to consume the shared content (e.g., NETFLIX®).

In some implementations, when a receiving user does not have the right to consume the shared content from any media provider, the communications system may inform the receiving user of one or more media providers that offer the shared content and may enable the receiving user to acquire rights to perceive the shared content by, for example, purchasing those rights from the one or more media providers. In some implementations, when the shared content may be communicated in different forms (e.g., using different video resolutions or different digital formats), the communications system may offer the receiving user the option to select a desired form for the shared content and, if necessary, purchase rights to access the shared content in that form from a particular media provider. In this manner, the communications system may, in some implementations, act as an intermediary that helps media providers increase their revenue and/or subscriber base by offering on-demand media content upgrades, purchases, or new subscriptions to users that receive media sharing messages from other users.

In some implementations, a wide range of media providers may be supported. Some media providers may be direct providers of content, including but not limited to websites and cloud-based sources of content (e.g., NETFLIX®, YOUTUBE®, iTunes®). Some media providers may be indirect providers of content, including but not limited to cable and other telecommunications providers or consumer electronics providers, which provide users with access to sources of content (e.g., HBO®). Such disparate types of media providers, which may have different types of relationships with different users, may be aggregated and managed to provide users with a truly source-agnostic experience of viewing and sharing media content amongst each other.

In one aspect, a method includes retrieving media content from a first media content provider for access by a sharing user, and receiving an indication that the sharing user desires to share the media content with a receiving user. The method also includes determining an identity of the receiving user with whom the sharing user desires to share the media content, and sharing the media content by sending an intermediate link that identifies the media content to be shared to a computer system of the receiving user. The method also includes receiving an indication that the receiving user has selected the intermediate link, and communicating an identity of the media content and the identity of the receiving user to an intermediate server. The method also includes obtaining a first universal resource locator (URL) from the intermediate server, the first URL having been determined by the intermediate server based on the identity of the media content and the identity of the receiving user. The method further includes, in response to the indication, retrieving the media content from a second media content provider using the first URL.

In some implementations of the method, the media content may include one or more of: photos, images, music, audio, movies, television shows, video clips, applications, games, electronic documents, e-books, or e-magazines.

In some implementations of the method, sharing the media content by sending the intermediate link may include sharing the media content by sending, to the receiving user, an electronic message that includes the intermediate link as an embedded hyperlink in message contents of the electronic message. In these implementations, the electronic message also may include one of an e-mail, an instant message, or a text message. In these implementations, the electronic message also may include a message included in a news feed provided to the receiving user by a social networking service provider.

In some implementations, retrieving the media content from the first media content provider may include a computer of the sharing user retrieving the media content by using a second URL to access the media content from the first media content provider. In these implementations, the intermediate link may be associated with a third URL, and the communicating of the identity of the media content and the identity of the receiving user to the intermediate server may occur through use of the third URL.

In some implementations, the method may include accessing digital rights information for the receiving user; determining a set of access options for accessing the media content available to the receiving user based on the digital rights information, the set of access options including an access option selectable to retrieve the media content from the second media content provider and an access option selectable to retrieve the media content from a third media content provider; selecting an access option from among the access options in the set; and identifying the first URL based on the selected access option. In these implementations, selecting the access option from among the access options in the set may include accessing default preferences for the receiving user, and automatically selecting the access option based on the default preferences. In these implementations, selecting the access option from among the access options in the set may also include enabling the receiving user to perceive the set of access options, and enabling the receiving user to manually select the access option from among the access options in the set.

In some implementations, the method may include communicating the identity of the media content and the identity of the receiving user to the intermediate server may include communicating the identity of the media content and the identity of the receiving user from the receiving user computer system to the intermediate server in response to the indication.

In another aspect, a system includes one or more computers and one or more storage devices storing instructions that are operable, when executed by the one or more computers, to cause the one or more computers to perform operations that include retrieving media content from a first media content provider for access by a sharing user, and receiving an indication that the sharing user desires to share the media content with a receiving user. The operations also include determining an identity of the receiving user with whom the sharing user desires to share the media content and sharing the media content by sending an intermediate link that identifies the media content to be shared to a computer system of the receiving user. The operations also include receiving an indication that the receiving user has selected the intermediate link, and communicating an identity of the media content and the identity of the receiving user to an intermediate server. The operations further include obtaining a first universal resource locator (URL) from the intermediate server, the first URL having been determined by the intermediate server based on the identity of the media content and the identity of the receiving user, and in response to the indication, retrieving the media content from a second media content provider using the first URL.

In some implementations of the system, the media content may include one or more of: photos, images, music, audio, movies, television shows, video clips, applications, games, electronic documents, e-books, or e-magazines.

In some implementations of the system, sharing the media content by sending the intermediate link may include sharing the media content by sending, to the receiving user, an electronic message that includes the intermediate link as an embedded hyperlink in message contents of the electronic message. In these implementations, the electronic message may include one of an e-mail, an instant message, or a text message. In these implementations, the electronic message also may include a message included in a news feed provided to the receiving user by a social networking service provider.

In some implementations of the system, retrieving the media content from the first media content provider may include a computer of the sharing user retrieving the media content by using a second URL to access the media content from the first media content provider. In these implementations, the intermediate link may be associated with a third URL, and the communicating of the identity of the media content and the identity of the receiving user to the intermediate server may occur through use of the third URL.

In another aspect, a computer-readable storage device storing software comprising instructions executable by one or more computers which, upon such execution, cause the one or more computers to perform operations that include retrieving media content from a first media content provider for access by a sharing user, and receiving an indication that the sharing user desires to share the media content with a receiving user. The operations also include determining an identity of the receiving user with whom the sharing user desires to share the media content, and sharing the media content by sending an intermediate link that identifies the media content to be shared to a computer system of the receiving user. The operations also include receiving an indication that the receiving user has selected the intermediate link, and communicating an identity of the media content and the identity of the receiving user to an intermediate server. The operations further include obtaining a first universal resource locator (URL) from the intermediate server, the first URL having been determined by the intermediate server based on the identity of the media content and the identity of the receiving user, and in response to the indication, retrieving the media content from a second media content provider using the first URL.

In some implementations of the device, the media content may include one or more of: photos, images, music, audio, movies, television shows, video clips, applications, games, electronic documents, e-books, or e-magazines.

In some implementations of the device, sharing the media content by sending the intermediate link may include sharing the media content by sending, to the receiving user, an electronic message that includes the intermediate link as an embedded hyperlink in message contents of the electronic message. In these implementations, the electronic message may include one of an e-mail, an instant message, or a text message. In these implementations, the electronic message may include a message included in a news feed provided to the receiving user by a social networking service provider.

In some implementations, retrieving the media content from the first media content provider may include a computer of the sharing user retrieving the media content by using a second URL to access the media content from the first media content provider. In these implementations, the intermediate link may be associated with a third URL, and the communicating of the identity of the media content and the identity of the receiving user to the intermediate server may occur through use of the third URL.

The details of one or more implementations of the subject matter described in this specification are set forth in the accompanying drawings and the description below. Other potential features and aspects of the subject matter will become apparent from the description, the drawings, and the claims.

DETAILED DESCRIPTION

Figure 1:
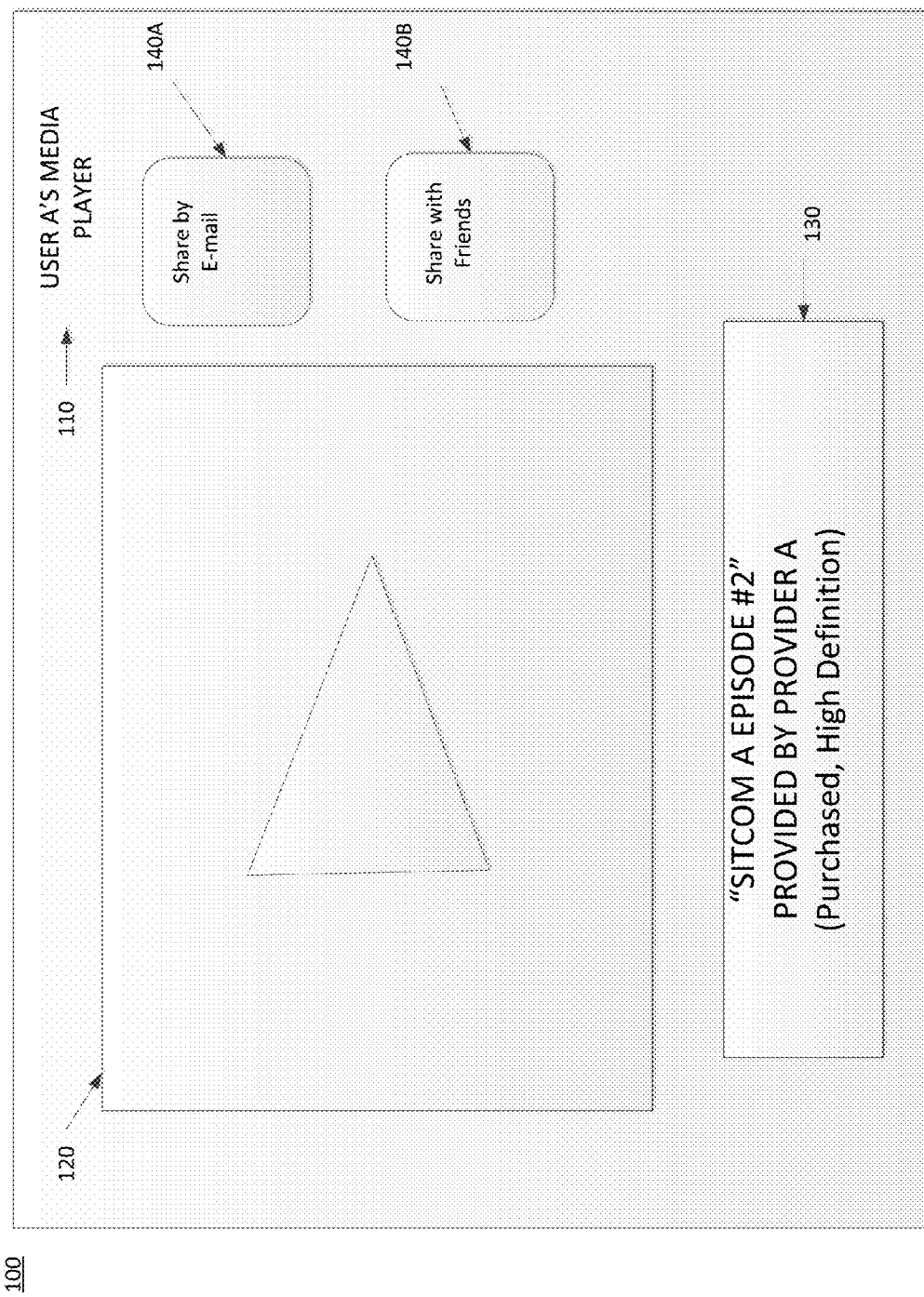
FIG. 1 is a graphical user interface (GUI) of a media player for a sharing user.

The disclosed techniques facilitate sharing of protected media between users. One approach to sharing media content involves a sharing user attempting to share content with a receiving user by providing the receiving user with a link specifying the Universal Resource Locator (URL) that the sharing user used to access the content. The problem with this approach is that the shared link is specific to the content source used by the sharing user to access the protected media content, and, therefore, if the receiving user does not have rights to access that media content from that same content source, the shared link may be unusable by the receiving user to access the protected media content. For example, if a customer of Media Provider X shares a protected piece of media, such as on a social network, with a customer of Media Provider Y, the link (e.g., a hyperlink embedded in a message in the receiving user's news feed) received by the receiving user will be useless because the receiving user does not have login credentials for Media Provider X. The receiving user, however, may have rights to view the protected piece of media, but those rights may be with respect to a different content source, Media Provider Y. Since many media providers protect their content and users frequently have access to the same media but from different sources, this sharing "dead end" impedes usability and makes it inconvenient to share media, which is undesirable for both users and media providers.

In view of this problem, the disclosed techniques facilitate media sharing by abstracting away the content source from the media sharing transaction and, thereby, avoiding the aforementioned dead ends. Specifically, the sharing of media content becomes a transaction that uses a link that identifies the shared content but is content source agnostic. The communication system facilitates the sharing of identified content by focusing on the identity of the shared content without regard to the source of that shared content and relating that identity to a digital rights profile of a receiving user in order to identify an appropriate content source for the shared content for the receiving user. Stated differently, the communication system provides an intermediary layer that facilitates digital sharing of protected media content by allowing receiving users to select an appropriate media provider or other media source when attempting to access shared content so that the receiving users are sent to their respective appropriate destinations to access the shared media.

Typically, when a sharing user indicates a desire to share media by, for example, selecting a share button displayed on a webpage or in a graphical user interface (GUI) of a media player application, the URL of the page or resource used by the sharing user to access the protected media content is what is shared with receiving users. For example, a sharing user may perceive an episode of a TV show on Media Provider X by viewing a media player page having the following URL:

http://www.providerx.net/tv/3/networks/NetworkA/ genre/Comedy/Player/Embedded/384950?id=23453

If the sharing user wishes to share the episode of the TV show with a receiving user, a link having the same URL noted above would typically be communicated to the receiving user in response to an indication that the sharing user wishes to share the episode of the TV show with the receiving user (e.g., in response to the sharing user selecting a "share with friends" button displayed on the media player page). In this example, however, the receiving user is unable to use the link to view the episode of the TV show because the receiving user does not have an account with Media Provider X and, therefore, does not have the right to access the episode of the TV show on Media Provider X. As such, the receiving user is at a dead end, despite the receiving user having an account with a Media Provider Y that allows the receiving user to access that same TV show episode at a media player page having the following URL:

https://www.providery.com/watch/TVShowA/ 7161145377506380112/tvshow#filter=online To avoid this dead end, the disclosed communications system does not provide receiving users with a link having the URL used by the sharing user to access the shared content media (e.g., the first link shown above used by the sharing user to access the shared TV show). Instead, the communications system provides a link (e.g., a hyperlink) to receiving users having a new URL to an intermediate server in response to a sharing user indicating a desire to share media. In the above example, the new URL that is provided to receiving users may be:

http://mediasharingplatform.tv/Sh8mK3d

As will be discussed in greater detail below, when the receiving user selects this link, a communications session is established between the receiving user's computer system and the intermediate server. In the above example, the intermediate server has a domain name "mediasharingplatform.tv" and the "Sh8mK3d" identifier is used by the intermediate server to uniquely identify the media content, i.e., the above-noted episode of the TV show, that is desired to be shared.

The intermediate server may identify a default source for the shared media content specified by or for the receiving user and may provide the receiving user's computer system with the ability to access the shared media content at the default source in response to an indication from the receiving user's computer system that the receiving user wishes to access the shared media content. In the above example, the intermediate server may receive an identity of the receiving user from, for example, the receiving user's computer system and may use that identity along with the "Sh8mk3d" media identifier to access the receiving user's digital rights profile and determine that the receiving user has access to the TV episode from Media Provider Y. The intermediate server may then communicate the second URL noted above to the receiving user's computer system, which may be used by the receiving user's computer system to access the TV episode from Media Provider Y. As illustrated by this example, the disclosed communications system enables the receiving user to access and consume the shared content (from Media Provider Y) despite the receiving user not having access to that shared content from the media provider of the sharing user (i.e., Media Provider X), thereby avoiding what would otherwise have led to a sharing dead end.

In some implementations, the media players of all media providers that have agreed to offer media sharing services may use the same new URL for sharing the same piece of media content. In the above example, therefore, the new URL shown above would be used by the media players of every media provider, including Media Provider X and Media Provider Y, to enable sharing of the same noted TV show episode.

The second URL noted above, which was used by the receiving user to access the TV episode, is different from the new URL and may be referred to as the "shared media content URL." The shared media content URL is a media provider-specific URL that identifies the location where a receiving user computer system may access the shared media content in the particular media provider's library. Notably, each of multiple receiving users may end up using a different shared media content URL to access the same piece of shared media.

In some implementations, the intermediate server may identify a group of media providers that each offers access to the shared media content and may enable the receiving user to select one (or more) of the media providers in the group for accessing the shared media content. The selection of the one (or more) media providers may occur either manually by the user or automatically in accordance with previously defined user default preferences specified by or for the user. In some implementations, geo-detection may be used to lookup the geographical location of a receiving user based on the Internet Protocol (IP) address of the corresponding recipient's computer system or the hostname of his or her Internet Service Provider. This information may be used to narrow down the list or group of media providers presented to the user for selection. For example, the geographical information may be used to limit the media providers presented to the recipient user to only those providers known to provide service in the user's geographical area. In some implementations, the user may be allowed to enter the user's zip code if the user determines that the user's provider is not included in the list or group of providers presented to the user (e.g., due to erroneous geo-detection). The zip code may then be used to identify one or more corresponding local media providers to be included in the displayed group.

In some implementations, the intermediate server also may enable the receiving user to select certain parameters that identify different versions or forms of the same piece of media content. The parameters may include, for example, digital formats (which can include, for example, specification of a container/file format and an audio or video codec), video resolution (e.g., standard definition or high definition), video or audio bit rates, and video frames per second. The digital formats may include, for example, .MP3 or .WAV for audio. In some implementations, the parameters also may include content-specific parameters (e.g., director's cut movie version, theatrical release movie version, edited version and unedited version, "NC-17" movie version, "R" movie version, and an alternate ending movie version). In some implementations, different versions or forms of the same piece of media content may be available for access to a user via different media providers. For example, one media provider may offer a standard resolution version of a movie while a different media provider may offer a high resolution (e.g., 1080p resolution version) version of that same movie. Notably, different versions or forms of the same piece of media content that are provided by a same media provider may correspond to the same shared media content identifier but may have different shared media content URLs.

The intermediate server, which may consist of one or multiple computers, may maintain rights profiles for users that have registered for media sharing services with the intermediate server. The rights profiles may include authentication information (e.g., user login identities and corresponding passwords) that registered users use to access different content sources. The intermediate server may use the authentication information stored in the rights profiles to interact with the media providers on behalf of the users. Specifically, the intermediate server may use the authentication information stored in the rights profile of a sharing user to interact with a media provider to obtain additional information about the piece of content that the sharing user wishes to share. The intermediate server also may use the rights profiles of receiving users to determine the availability of the shared piece of content to the receiving users by, for example, using the authentication information to poll the media providers.

Notably, the disclosed techniques and systems are broadly applicable to the sharing of any type of protected media content. For example, the disclosed techniques and systems may be used for sharing photos, images, music (e.g., song files), audio (e.g., sound effect files), movies, television shows, video clips, applications, games, data files, electronic documents, e-books, or e-magazines.

In some implementations, the intermediate server may access a comprehensive library of all known media content URLs for media distribution. This may be used by the intermediate server to provide to the receiving user computer systems the appropriate shared media content URLs that can be used by the receiving user computer systems to access the shared media content from the receiving users' respective media providers in accordance with their respective rights profiles.

FIGS. 1-5 illustrate example GUIs of a media player application that includes a media sharing capability. Specifically, the media player application includes a media sharing program module that enables the sharing of protected media content. For ease of exposition, the example GUI's depicted in FIGS. 1-5 are described with respect to a particular scenario in which a User A shares a piece of protected media content with a Friend C.

FIG. 1 shows an example media player GUI 100 that allows a user to access and perceive media content and share the media content with other users. The media content that may be played through user interaction with the media player GUI 100 may include, for example, video, such as, for example, movies, video clips, and TV shows. In other implementations, the media player GUI 100 may be additionally or alternatively configured to enable a user to consume and share other types of media content, such as, for example, audio files (e.g., song recordings, lecture recordings, dictation recordings, and sound effect recordings) or electronic written content (e.g., MICROSOFT® WORD document files, e-books or e-magazines).

In the particular example illustrated in FIG. 1, User A is interacting with the GUI 100 to play a particular episode of a TV show, i.e., Episode #2 of Sitcom A. The GUI 100 includes a graphical display 110 that identifies the GUI 100 as a media player page of "User A," and further includes a play window 120 in which the video content corresponding to Episode #2 of Situation Comedy (Sitcom) A is being displayed. The play window 120 may include a set of graphical elements (e.g., graphical buttons) with which the user may interact to control the position and size (e.g., expand to full screen) of the playback window 120 and/or the playback functions of the media player (e.g., play the video, pause the video, rewind the video, and fast-forward the video). The set of graphical elements may, for example, be represented by user-selectable icons in a graphical toolbar positioned in the play window 120 (e.g., a horizontally-oriented graphical toolbar positioned at the top or the bottom of the play window 120).

The GUI 100 may further include a content label 130 that identifies the media content being played to the user by the media player. The content label 130 may optionally identify the media provider that is providing the played media content and the form or version of the played media content. In some implementations, the content label 130 also may identify the access option used to access the played media content. For example, the content label 130 may indicate that the user was given access to the played media content because the user purchased the media content from the media provider, because the media content is provided as part of a subscription that the user has with the media provider, because the media content is provided on a promotional basis by the media provider (e.g., the episode may be accessed for free in June to entice the user to get a premium subscription with the media provider), or because the media content is provided to the user (or all users) for free.

The distinction between user access to a piece of media through user purchase from a media provider and user access to a piece of media through a subscription with the media provider is worth noting. When a user is able to access a piece of media from a media provider through a subscription, that access is typically conditioned on the user continuing to provide compensation to the media provider over time. For example, the access to the piece of media may only be provided to the user if the user continues to pay the media provider on a periodic basis to maintain the subscription with the media provider (e.g., the user continues to pay a monthly, a quarterly, or a yearly subscription fee to the media provider or has to pay a per-use access fee each time the user accesses the piece of media content from the media provider). In contrast, when a user purchases a piece of media from a media provider, the user is typically entitled to repeatedly access and consume the purchased piece of media without having to provide further payments to the media provider. That is, the purchase is the electronic equivalent to going to a brick and mortar store and selecting and purchasing the piece of media (e.g., embodied in a DVD or CD). Just like a brick and mortar purchase, a purchase of a piece of media from a media provider is viewed by the user as ownership of that piece of media, with the media provider merely providing a more convenient mode of storage of that piece of media than that provided by a physical item, such as that provided by a DVD or a compact disk (CD). Such electronically purchased media may be downloaded to the user's playback device (e.g., smart phone, desktop computer or mobile computer) and/or may be stored by the media provider in storage devices remote to the user's playback device but accessible by the user's playback device through, for example, data streaming. Such remotely stored pieces of media content may be referred to as being stored "in the cloud." Notably, unlike brick and mortar purchases, licensing restrictions may sometimes limit the ability of the media provider to always provide the user access to pieces of media purchased by the user that are stored in the cloud.

The content label 130 may include text and/or graphical elements (e.g., logos) that communicate any or all of the above-noted information. In the example shown in FIG. 1, the content label 130 indicates that User A is using the media player to play a particular episode, i.e., Episode #2, of a particular TV show, i.e., Sitcom A. The content label 130 further indicates that the episode was provided to the user by Media Provider A, that the episode was purchased by the user, and that the user purchased the high definition version of the episode. Additionally, the content label 130 may include other information about the content that is not shown in the example of FIG. 1, or omit information that is shown in FIG. 1, depending on the type of content. For example, if the media player is used to depict an image rather than a video in the play window 120, the content label 130 may include information about the resolution and/or color depth of the image. If the media player is instead used to depict an audio file in the play window 120, the content label 130 may have information about the sampling rate or duration of the audio file. The content label 130 also may include information about the creator of the piece of media and the time of creation of the piece of media.

The GUI 100 further includes graphical elements (e.g., graphical buttons or elements in a displayed menu or pull-down menu) that are selectable by the user to share the piece of media that the user is currently perceiving with other users. The user may select the graphical elements by, for example, using a pointer device (e.g., a mouse) to position a pointer over the graphical element and then depressing a selection button on the pointer device (e.g., depressing a mouse button) or on another input device of the recipient's computer system. In some implementations, recipient's computer system has a touchscreen surface that allows the user to select graphical elements by positioning a finger or a pointing device (e.g., a stylus) directly in contact with or in close physical proximity to the portion of the touchscreen at which the graphical element is displayed.

In the example shown in FIG. 1, the GUI 100 includes a graphical element 140A and a graphical element 140B that are each selectable to share the piece of media with other users through use of two different communications service provider systems. Specifically, the graphical element 140A is selectable by the user to share the piece of media content with other users through use of an e-mail communications system, and the graphical element 140B is selectable by the user to share the piece of media content with other users (i.e., "friends") through use of a social networking system. As described previously, the sharing of a piece of protected media may occur by communicating from the sharing user to receiving users a message that includes a link to an intermediate server. Each of the receiving users may then select the link to interact with the intermediate server to obtain access to the shared content in a way that is not tethered to the particular media provider of the sharing user. Thus, it should be noted that any communications service provider system that supports communication of messages having user-selectable links may be used to enable the sharing of protected media content. For ease of illustration, FIGS. 2-5 focus on the sharing of a piece of media through selection of the graphical element 140B and, hence, through communications facilitated by a social networking system. Nevertheless, it should be noted that other communications service provider systems may be used to facilitate the sharing.

For example, if the user selects graphical element 140A, which corresponds to sharing by e-mail, the media sharing program module (or application) may communicate with an e-mail application (through use of, for example, application programming interface (API) commands) to automatically or manually identify one or more receiving users and to prepare and send an e-mail to each of the receiving users that includes the link selectable by the receiving users to access the intermediate server and that is communicated to the receiving users through an e-mail communications system. For example, the media sharing application may automatically launch the e-mail application and generate an e-mail that includes (e.g., in the body of the e-mail or as an attachment) a message and the link to the intermediate server for delivery to the receiving users. For example, the e-mail may include the message "I really like this video. Check it out by selecting the link below." and may further include a hyperlink with an embedded URL to the intermediate server that includes an identifier of the shared media content. The media sharing application also may either prompt the sharing user to identify the receiving users by, for example, manually populating the "To:" field of the e-mail header (e.g., entering e-mail addresses by typing them in or selecting them from an address book) or may simply automatically populate the "To:" field based on stored user preferences specified by or for the sharing user (e.g., send to all users in my "coworkers" e-mail group). The sharing user may then select to send the messages by, for example, selecting a graphical "send" button displayed in a GUI of the e-mail application or in a GUI of the media player application.

In some implementations, the GUI 100 may additionally or alternatively include a graphical element selectable to share the piece of media content through use of a Simple Message Service (SMS) messaging system and/or a graphical element selectable to share the piece of media content through use of an instant messaging system. The interactions between the media sharing application and the SMS system or the instant messaging system may occur in a manner similar to that described above with respect to an e-mail system. That is, the receiving users may be identified manually or automatically based on the sharing user's contacts and the text messages or instant messages may be pre-populated with message content and a link to the intermediate server. The messages may then be sent to the receiving users by the SMS application or by the instant messaging application manually (i.e., in response to the sharing user manually selecting to send the messages after reviewing the message contents) or automatically (without requiring further interaction with the sharing user).

In some implementations, the sharing user may interact with the GUI of the media player application to specify a group of users for media content sharing that will automatically be designated as the receiving users when the user selects to share the media content. In such implementations, the media sharing application may interact with the communications service provider application (e.g., through use of API commands) in a way that is largely transparent to the user such that, upon the user selecting the sharing graphical element, communications having a corresponding message and link get automatically sent to the users in the specified sharing group of users without requiring any further interaction from the sharing user. In these implementations, the sharing user may merely be provided with a notification message (e.g., a textual message in proximity to the selected graphical element) that indicates that the messages have been automatically sent. For example, if the sharing occurs through use of an instant messaging system, the user may identify the sharing group as the group of users in the user's buddy list. If the sharing occurs through use of a social networking system, the user may identify the sharing group as the group of users in the user's friends list.

The user may select the graphical element 140B to share the perceived piece of media content with the user's "friends" on a social network. The social network may be a social networking service such as, for example, FACE-BOOK®, GOOGLE+, TUMBLR and TWITTER®. A social networking service is a computer system that enables users to build social networks or social relations with each other by enabling the users to, for example, share interests, activities, backgrounds, and/or real-life connections. The computer system typically enables users to create representation of themselves, such as, for example, a user profile or page that is stored by the computer system and that is accessible to the user and to other users.

The user profile or page may include the user's social links, interests, pictures posted by the user, ideas or messages posted by the user, activities or events that the user is involved in, status of the user, and a variety of services that may be used by other users to communicate with the user (e.g., blog posts, e-mail or instant messaging). The social networking service enables a user to identify a group of users as the user's "friends." A friend of a user may enjoy privileged access to the user's profile or page (e.g., may perceive additional content on the profile or page that is only shown to the user's friends) and preferential mechanisms to communicate with the user (e.g., may have access to a private telephone number or a private e-mail address).

Moreover, the social networking computer system may be configured to provide a user with a social feed or a news feed. The social feed or news feed may take the form of a grouping (e.g., a list) of messages that indicate the user's activities on the social networking computer system, the activities of the user's friends on the social networking computer system, and, in some implementations, the aggregate activities of other users on the social networking computer system (which may include users that are not the user's friends). For example, the user may receive a message in the news feed that indicates that Friend A updated his profile information and another message that Friend B added 2 photos to one of his photo albums. In some implementations, the messages are listed in reverse chronological order. Notably, the messages may include links selectable by the user perceiving the news feed. For example, the message indicating that Friend B added 2 photos to one of his photo albums may include an embedded hyperlink selectable by the user to view the photo album to which the 2 photos were added by Friend B.

In response to the user selecting the graphical element 140B, the media sharing program module may generate API commands that are communicated to a social networking application to direct the social networking application to deliver messages to recipient users that will be placed in their respective news feeds to inform them that the sharing user "likes" the video (or, more generally, piece of media content) that is being played by the media player application (or, more generally, consumed through use of the media player application). Each message received by a recipient user may include a link (e.g., a hyperlink) selectable by the recipient user to perceive the shared video. Notably, the API commands may instruct the social networking application to embed into each message a link that uses a special, shortened URL (corresponding to the previously noted new URL) that is selectable to access the intermediate server. In some implementations, the special, shortened URL may include a shared media content identifier that uniquely identifies the video (or, more generally, the piece of media content) that is desired to be shared by the sharing user. As described in more detail below, the intermediate server then establishes, through user interaction and/or automatic search and determination, sources that the receiving user can use to access the identified piece of media content.

The above implementation example assumes that the social network has a social feed and that messages that include the link to the intermediary server are provided to users in their respective social feeds. In other implementations, the messages that include the link are additionally or alternatively provided to the users of the social network in a different manner. For example, they may be included in blog posts. In some implementations, the social network may be an online networking website, an online dating website, or another specialized social network. In some implementations, the social network may be a single message board and the messages may be a single post on that single message board directed to all users that have access to the message board or that have access to a particular thread in the message board.

In some implementations, when a user accesses a particular media player page made available by a media provider, the data sent to the user's computer system for displaying and interacting with the media content displayed in that page includes the shortened URL noted previously (i.e., the URL that may be used to access the intermediate server and that includes the shared media content identifier for the media content that is being perceived by the user). In these implementations, the shortened URL may be placed directly by the media sharing program module into the messages to be communicated to receiving users by the communications application of the communications service provider system or may be sent directly to the communications service provider system for inclusion in the messages to be sent to receiving users. In these implementations, the communications service provider system may simply treat the messages received from the user's computer like any other conventional messages having links that are handled by the communications service provider system.

Figure 2:
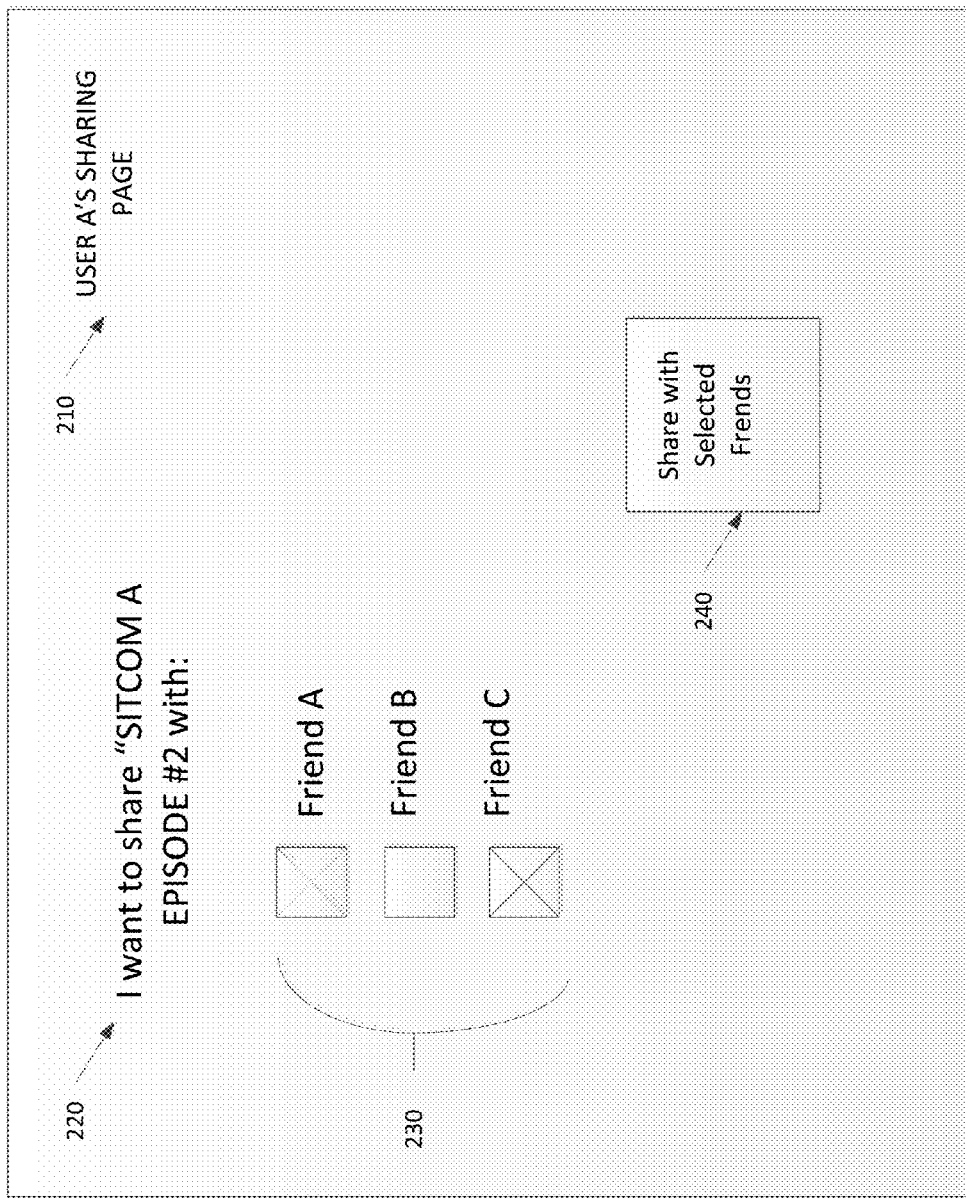
FIG. 2 is a GUI showing a sharing page for a sharing user.

FIG. 2 shows a GUI 200 with which a sharing user may interact to share the perceived media content with a selected subset of the user's friends. As noted above, in some implementations, the sharing user is not presented with the GUI 200, and, instead, messages are automatically sent to all of the sharing user's friends upon the sharing user selecting the graphical element 140B. In some implementations, the sharing user may set a default preference with the sharing program module of the media player application that indicates whether the user wishes or does not wish to manually specify a subset of his or her friends through interactions with the GUI 200 upon selecting the graphical element 140B.

The GUI 200 may include a title 210 that identifies the GUI 200 as a sharing page and may further include a notification 220 that prompts the user to select one or more of his friends for purposes of sharing the media content. The GUI 200 may include a graphical display 230 with which the user may interact to select one or more of his friends as recipients of the shared media content. In some implementations, the media sharing program module identifies the friends of the user by interacting with the social networking application through use of API commands.

The graphical display 230 shown in FIG. 2 shows user identities of three friends of the user, Friend A, Friend B and Friend C, with corresponding checkboxes next to each user identity. As shown in FIG. 2, the user has checked the boxes next to Friend A and Friend C, indicating that the user wishes to share the perceived media content with the users corresponding to the user identities "Friend A" and "Friend C." The user may then trigger the sharing operation by selecting the graphical element 240 (e.g., a graphical button). In some implementations, selection of the graphical element 240 may result in messages being received in Friend A's news feed and in Friend C's news feed. The messages may be identical and may be, for example, "User A likes Episode #2 of Sitcom A," where "User A" is a user identifier (e.g., a name) of the user. The "Episode #2 of Sitcom A" may be underlined in the message to designate it as the anchor of the hyperlink. The hyperlink may include a URL to the intermediate server and a content identifier that may uniquely identify the piece of content to be shared, in this case Episode #2 of Sitcom A. The hyperlink may be selected by Friend A or Friend C to cause their respective computer systems to establish a communications session with the intermediate server to enable Friend A or Friend C to access the shared media content.

While FIG. 2 shows a relatively simply interface for enabling a user to select one or more of his or her friends, any interface that enables a user to identify a subset of his or her friends may be used. For example, friends may be grouped together into different groups and the user may select a group from among a set of displayed groups for sharing the media content. Notably, the word "friend" is used in a generic sense that indicates any individual with whom the sharing user has contact on a social networking site. Whether the receiving user is a personal friend, a professional colleague, a family member, an acquaintance, a potential romantic interest, a potential customer, or even an individual that the sending user does not know but simply has contact information for, that user may be considered a "friend" in the context of someone with whom the sending user may share content through an appropriate social network. In some implementations, the sending user must manually designate a user as a friend by, for example, accepting a friend invitation from that user or by sending a friend invitation to that user that is then accepted by that user.

In some implementations, the display 230 of the group of friends presented to the user in GUI 200 changes depending on the access rights of those friends to the piece of media content that is desired to be shared. In some implementations, the media sharing program module may acquire the user identities of the friends from, for example, the social networking application, and may communicate with the intermediate server to determine the access rights to the shared piece of media content for each one of the acquired user identities. The intermediate server may use the user identities to access rights profiles (which may or may not exist) for each of the user identities and may then use those rights profiles to determine corresponding access rights to the shared piece of media content. The display 230 presented to the user may then be modified based on the determined access rights.

For example, in some implementations, if the intermediate server determines that a user identity is unable to access the shared piece of media content without spending money, the intermediate server may communicate this to the media sharing program module. The media sharing program module may then visually distinguish in the graphical display 230 those friends that must spend money to view the shared media content from those friends that do not need to spend money to view the shared media content. Such information enables the sending user to know in advance which receiving users are able to access the shared media content without such access imposing an undue financial burden on them.

In some implementations, the user rights profiles may include an indication of age and/or a confidential access clearance level (i.e., a security level) of the user. If the rights profile of a friend indicates that the friend is unable to view adult-only content (e.g., NC-17 movies) because the friend is a child (e.g., under 17 years of age), the display 230 may be modified to, for example, not include the underage friend in the list of friends for selection by the user when the user is attempting to share adult-only media content or to visually distinguish the underage friend in the list of friends in a manner that indicates that the friend is underage (e.g., highlighting or using a different color font when displaying the underage friend's user identifier in the display 230). If the rights profile of a friend indicates that the friend does not have a high-enough security level to view confidential media content, the display 230 may be modified to, for example, not include the friend in the list of friends when the user is attempting to share confidential media content or to visually distinguish the friend in the list of friends in a manner that indicates that the friend does not have the proper security clearance to access the confidential media content (e.g., highlighting or using a different color font when displaying the friend's user identifier in the display 230).

In some implementations, the display 230 may be modified to visually distinguish friends that have registered for media content sharing services with the intermediate server from friends that have not registered for media content sharing services. Such information enables the sharing user to know that no access rights information is known for the un-registered friends and that those unregistered friends may be prompted to register for media sharing services upon selection of the sharing link included in the sharing user's message.

In some implementations, the media sharing module enables the user to setup sharing preferences that modify the group of receiving users with which media content may be shared based on their different access rights relative to the media that is desired to be shared. These sharing preferences may be used to pre-populate the friend selection GUI 200 presented to the user. For example, the preferences may be used to pre-populate the checkboxes in the display 230. The sharing preferences also may be used when the receiving users are instead automatically selected and the corresponding messages are automatically delivered to the receiving users without further interaction with the user upon the user selecting a sharing graphical element (e.g., graphical element 140A or 140B) in the media player GUI (e.g., GUI 100). For example, the user may select the graphical element 140B in order to share a movie with his or her friends. In response to and upon the user selecting the graphical element 140B, the media sharing program module may access the user's sharing preferences and, based on those preferences, may automatically instruct the social network provider computer system to place a message with a link to access the movie in the news feeds of only those friends that can view the movie without having to pay for viewing the movie.

In some implementations, the media sharing program module may change the form or version of the shared media content for the receiving users based on their different access rights. For example, the intermediate server may determine from their respective rights profiles that Friend A is 21 years old and Friend C is 15 years old. The intermediate server may then inform the media sharing program module that it may be possible to send an uncut, R-rated version of a movie to Friend A and an edited, PG-13 rated version of the same movie to Friend C in order to respect that the adult content in the R-rated version may not be suitable for Friend C. For example, the display 230 of GUI 200 may indicate that Friend C will receive the edited, PG-13 rated version by, for example, displaying text (e.g., "PG-13 Version Only") next to or in proximity to the user identifier "Friend C." In some implementations, the display 230 of GUI 200 also may indicate that Friend A will receive the R-rated version of the movie by, for example, displaying text (e.g., "R-rated version") next to or in proximity to the user identifier "Friend A." In some implementations, if the user desires to share the movie with both Friend A and Friend C, the sharing program module may use API commands to communicate with the social networking application to embed into the message directed to Friend A a link that includes a special, shortened URL selectable to access the intermediate server and that identifies the R-rated version of the movie and may communicate with the social networking application to embed into the message directed to Friend C a link that includes a different URL selectable to access the intermediate server but that identifies the PG-13 version of the movie. In other implementations, the content identifier in the links are not version/form-specific such that the same URL is used to identify all versions or forms of the same piece of content. In these implementations, the ultimate shared media content URL that is used by the receiving user's computer system to access a particular form or version of the media content will be determined based on the access option later selected by or for the receiving user.

Figure 3:
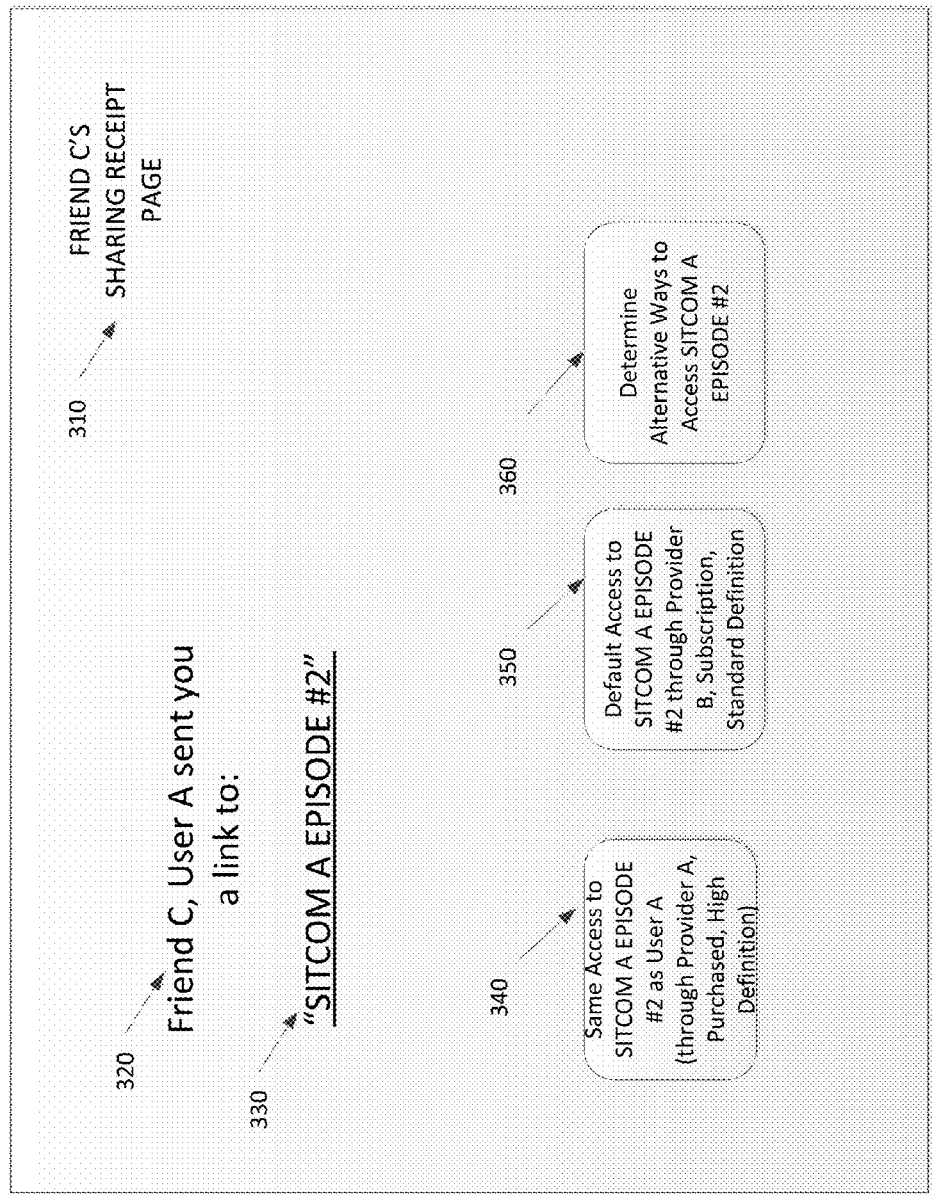
FIG. 3 is a GUI showing a sharing receipt page for a receiving user.

FIG. 3 shows a GUI 300 that may be displayed to a user in response to the user selecting a sharing link included in a message received from a communication service provider system (e.g., in response to the user selecting a link included in a message in the user's news feed). Upon a user selecting a sharing link in a received message, the receiving user's computer system may access the intermediate server using the link to establish a communication session with the intermediate server. The GUI 300 may be presented to the user when the communication session is setup as a result of communications exchanged between the intermediate server and the receiving user's computer system. In some implementations, the intermediate server has web server functionality, and the GUI 300 is a webpage displayed by a web browser resident on the receiving user's computer system.

The GUI 300 includes a notification 320 that informs the receiving user of the identity of the sharing user and displays a content identifier 330 (e.g., a name) that describes the content that the sharing user desires to share with the receiving user. In the example shown in FIG. 3, the content identifier is "Sitcom A Episode#2." Notably, this content identifier is typically different from but may be the same as the content identifier included in the shortened URL associated with the sharing link selected by the receiving user. In some implementations, the content identifier shown in GUI 300 is the same as the anchor of a hypertext sharing link selected by the receiving user.

The GUI 300 also may include a graphical display 310 that identifies the GUI 300 as a sharing receipt page of the user having the user identifier "Friend C." The GUI 300 further includes a set of graphical elements 340, 350 and 360 that are selectable by the user to choose a particular method of accessing the shared media content.

In the example shown in FIG. 3, the user may select the graphical element 340 (e.g., graphical button) to access a high-definition version of the shared TV episode provided by Media Provider A, which is the same media provider that was used by the sharing user to access the TV episode. The graphical element 340 shows that the user purchased the high-definition version of the shared TV episode from the Media Provider A and, therefore, has ownership access rights to this version of the shared TV episode.

The user may instead select the graphical element 350 to use a default access option specified in user preferences setup by or for the user. The default access preferences may identify a preferred media provider and a preferred form or version of shared pieces of media content that can be used to narrow down the access options made available to the user in GUI 300 when the user has access options for the same piece of shared content available from multiple different media providers.

In some implementations, a user may identify a preferred media provider and/or version as being the same media provider and/or version that was used by the sharing user to access the shared media content. Notably, if Friend C set his or her default preferences to select the same media provider and version as that used by the sharing user (User A) to access the shared content, graphical elements 340 and 350 would be combined into a single graphical element.

In some implementations, the user may specify a preferred version as the highest quality version of the piece of media content that is accessible to the user. If the piece of media content is a video, for example, the user may specify that high-definition versions of the piece of media content should take precedence over standard definition versions of the piece of media content. If the piece of media content is an image, the user may specify that the highest resolution image should take precedence over lower resolution images. If the piece of media content is an audio file, the user may specify that the highest bit-rate audio file should take precedence over lower bit-rate audio files.

In some implementations, a user may identify a preferred media provider by providing a prioritized list of media providers. The intermediate server may then identify which of the media providers have given the user access rights to the shared media content and may then select from among those identified media providers the media provider having the highest priority in the list.

In some implementations, the user additionally or alternatively may identify a preferred media provider based on the type of access rights that the user has with the preferred media provider. For example, the user may designate that media providers that offer free access to the shared media should be chosen over media providers that did not offer the shared media to the user for free (e.g., the user purchased the shared media from those providers or the user has a paid subscription that allows the user to access the shared media from those providers). The user also may designate that the media providers from which the user purchased the shared media content should take precedence over the media providers from which the user has acquired access to the shared media content via a subscription or a rental relationship. The user also may designate that accessing the shared media content from a local storage device (e.g., a DVR) should take precedence over other access options. The different types of access rights and relationships are described in further detail below.

The user's default access preferences may be defined in any of a number of different ways that combine both preferred media provider information and preferred version information. Various conditions and branching may be used to select the appropriate default access option from among multiple available access options to the user based on the user's default access preferences. For example, a user may identify Media Provider A as the preferred media provider UNLESS another media provider offers a higher quality version of the shared piece of media content, in which case that other media provider is designated as the preferred media provider. The media sharing program module may provide a variety of different GUIs to enable the user to set up appropriate priorities and conditions to allow the user to tailor the default access option to suit his or her desires.

In some implementations, the user's default access preferences may indicate that the determined default access option should automatically be selected for the user without requiring the user to make a manual selection via interactions with a GUI. In these implementations, the user is not presented with the GUI 300. Instead and in response to the user selecting the sharing link in the received message from the sharing user, the user is presented with the appropriate media player application GUI for perceiving the shared content provided by the media provider that corresponds to the determined default access option.

Referring back to FIG. 3, the GUI 300 also includes a graphical element 360 selectable by the user to request other alternative access options for accessing the shared media content. The GUI 300 decreases the complexity of selecting a particular access option by limiting the access options presented to the user for selection in two ways. First, the presented access options are only those that are currently available to the user without the user having to pay any additional fees. And, second, the access options presented to the user are limited to either the same access used by the sharing user (which is shown in GUI 300 only if it is available to the receiving user without having to pay an additional fee) and the default access option available to the user, which was selected from among all of the access options available to the user (without paying a fee) in accordance with the user's default access preferences. Notably, if no access option is available to the user without the user having to pay a fee, the GUI 300 may instead display those access options that require the user to pay a fee to access the shared content.

Figure 4:
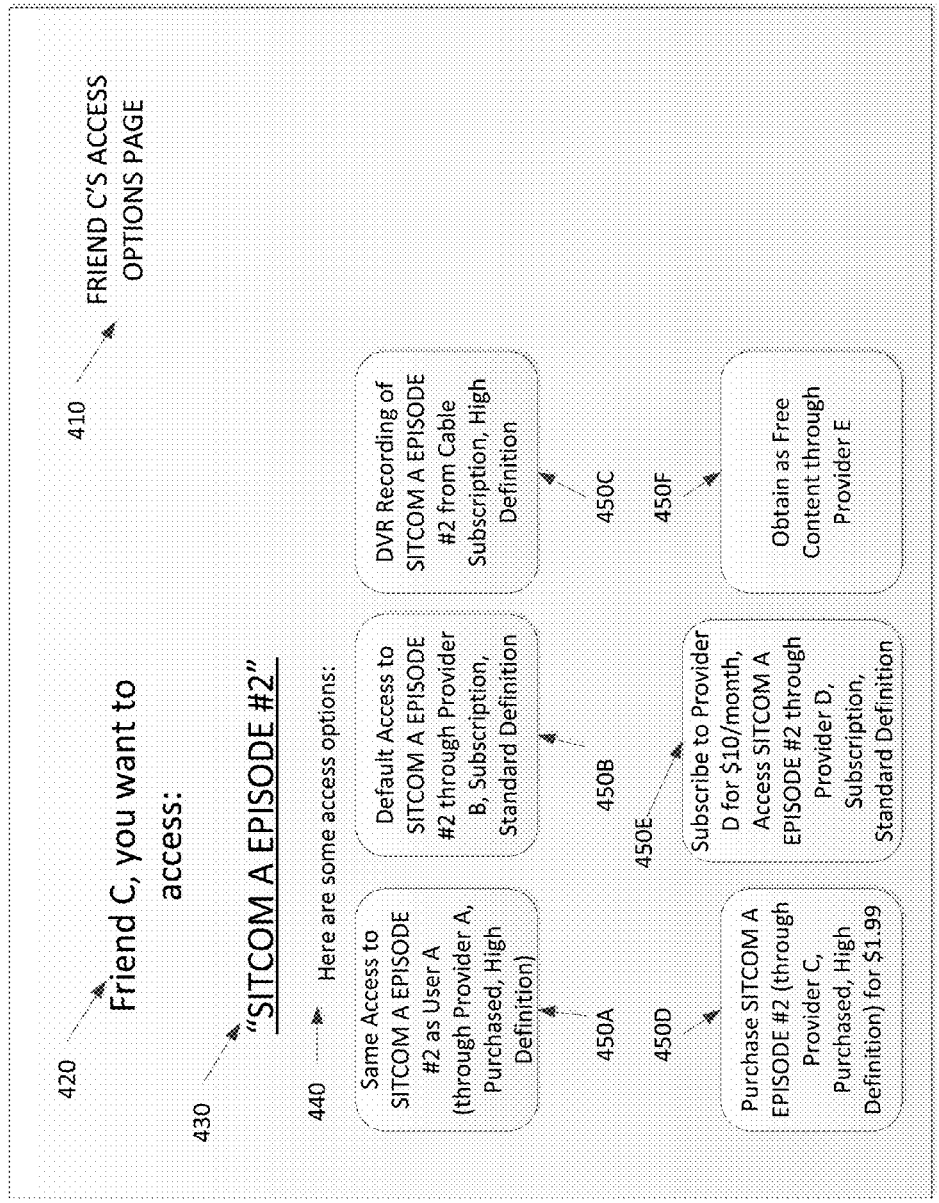
FIG. 4 is a GUI showing an access options page for a receiving user.

FIG. 4 shows a GUI 400 that may be presented to the user in response to and upon the user selecting graphical element 360 of GUI 300. GUI 400 is similar to GUI 300 but displays a more exhaustive list of access options, which may include access options that require the user to pay a fee to access the shared content. GUI 400 includes a graphical display 410 that identifies the GUI 400 as an access options page of "Friend C" and further includes a notification 420 that displays a content identifier 430 that identifies the shared media content, and a graphical display 440 indicating a list of access options. The GUI 400 also includes a set of graphical elements 450A, 450B, 450C, 450D, 450E and 450F that are selectable by the user to choose a particular method of accessing the shared media content. Notably, graphical elements 450A and 450B may, in some implementations, have the same function as graphical elements 340 and 350 of GUI 300.

Graphical elements 450C and 450F correspond to access options that the user can use to access the shared media content without paying a fee. These access options, however, were not selected for inclusion in GUI 300 because they were not identified as the default access option. Nevertheless, these access options are presented to the user in GUI 400 as other alternative options for accessing the shared media content.

Graphical elements 450D and 450E correspond to access options that the user can use to access the shared media content by paying a fee. Specifically, the user may select graphical element 450D to initiate a transaction with Media Provider C to purchase a high definition version of the shared TV show episode "Sitcom A Episode #2" for $1.99. The user may instead select graphical element 450E to initiate a transaction with Media Provider D to obtain a subscription with Media Provider D that will allow the user to access a standard definition version of the shared TV show episode. By offering receiving users access options that require payment of a fee to access the shared media, the system is able to help media providers obtain new revenue from users as part of the media sharing transaction.

In some implementations, the intermediate server handles the transaction on behalf of the media provider by receiving the appropriate payment or payment information and communicating the same to the media provider communications system, which then changes the receiving user's access rights to allow the user to access the content. In other implementations, selection by the receiving user of an access option that requires payment of a fee automatically triggers a new communication session to be setup between the receiving user's computer system and the corresponding media provider communications system that provides the receiving user with the interfaces necessary to pay for the access option. Upon payment being completed, the media provider communications system may then send a message to the intermediate server that causes the intermediate server to update the user's rights profile accordingly and, in some implementations, to communicate the corresponding shared media content URL to the receiving user's computer system to enable access to the shared media content.

In some implementations, the intermediate server may select only a subset of the media providers that are available to provide the user with access to the shared media content for a fee. The subset of media providers may be selected to include only those media providers that have a preferential relationship with the operators of the intermediate server. For example, media providers that have agreed to perform revenue sharing with the operators of the intermediate server may be given preferential treatment by including their access options in the GUI 400 and not including the access options of other media providers that have not agreed to such revenue sharing.

Figure 5:
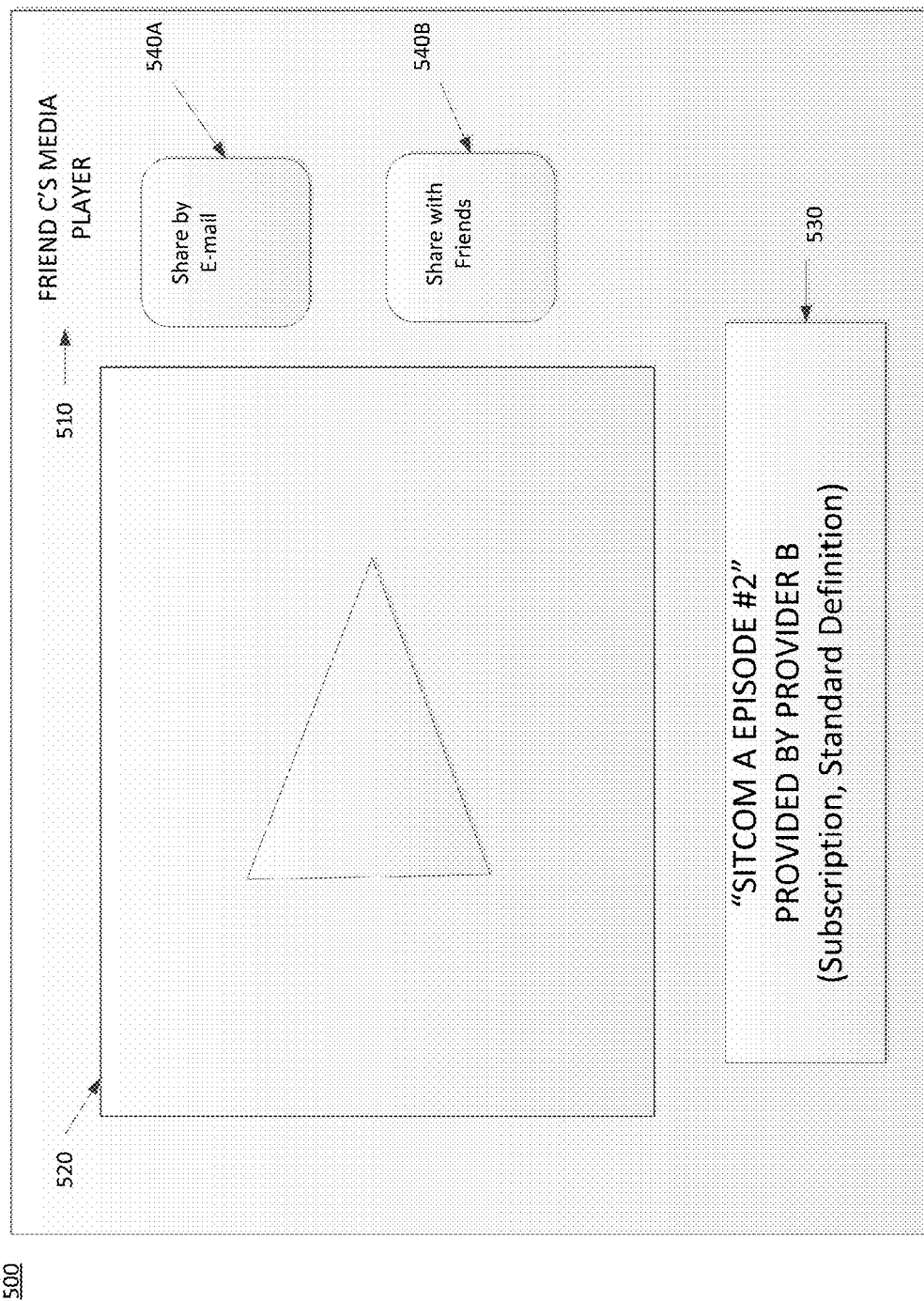
FIG. 5 is a GUI of a media player for a receiving user.

FIG. 5 shows an example media player GUI 500 that allows a user to access and perceive media content and share the media content with other users. GUI 500 may be presented to Friend C in response to and upon the user selecting an access option through interactions with, for example, GUI 300 or GUI 400. In the particular example shown in FIG. 5, GUI 500 was presented to the user in response to the user selecting graphical element 350 of GUI 300 or graphical element 450B of GUI 400 in order to perceive the shared TV episode "Sitcom A Episode #2." GUI 500 includes a graphical display 510, a play window 520, a content label 530, and sharing user-selectable graphical elements 540A and 540B that may, in some implementations, perform the same functions as the graphical display 110, the play window 120, the content label 130, and the sharing user-selectable graphical elements 140A and 140B, respectively, of GUI 100.

Figure 6:
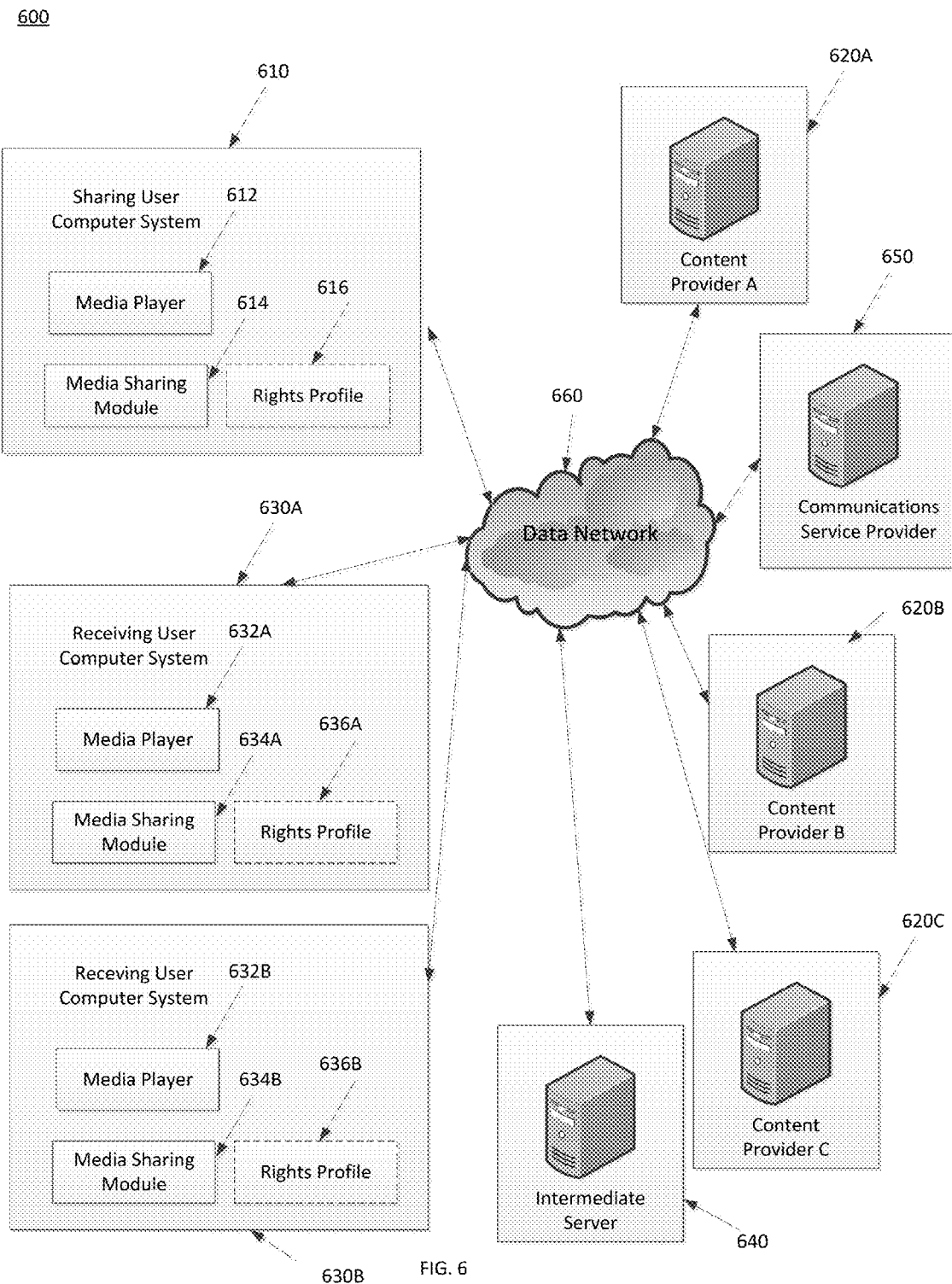
FIG. 6 is a block diagram illustrating a communications system that enables media sharing between users.

FIG. 6 illustrates a block diagram of an exemplary communications system 600 configured to enable users to share multimedia content with each other. The communications system 600 includes a sharing user computer system 610 that is configured to enable a sharing user to access and share multimedia content provided by one or more of multiple media provider computer systems. In the exemplary system shown in FIG. 6, the media provider computer systems include a media provider computer system 620A that is configured to enable user access to a library of media content (i.e., a collection of media content) managed by Media Provider A, a media provider computer system 620B that is configured to enable user access to a library of media content managed by Media Provider B, and a media provider computer system 620C that is configured to enable user access to a library of media content managed by Media Provider C. The system 600 further includes receiving user computer systems 630A and 630B that are configured to enable receiving users to access shared media content from one or more of the multiple media provider computer systems in response to selection of a link included in a message sent to the receiving users by the sharing user. The system 600 further includes an intermediary server 640 that is accessed by the receiving users in response to selection of the sharing links included in the messages and that facilitates user access to the shared media content. The system 600 also includes a communications service provider computer system 650 configured to facilitate the communication of messages between the sharing user and the receiving users over a data network 660.

The sharing user computer system 610 is an electronic device configured with hardware and software that enables the device to interface with a user and run hardware and software applications to perform various processing tasks. The sharing user computer system 610 may be a Smartphone, a tablet computer, a notebook computer, a laptop computer, a digital video recorder, an e-book reader, a music player, a desktop computer or any other appropriate portable or stationary computing device. The sharing user computer system 610 may include one or more processors configured to execute instructions stored by a computer readable medium for performing various client operations, such as input/output, communication, data processing, and the like. For example, the sharing user computer system 610 may include or communicate with a display and may present information to a user through the display. The display may be implemented as a proximity-sensitive or touch-sensitive display (e.g. a touch screen) such that the user may enter information by touching or hovering a control object (for example, a finger or stylus) over the display.

The sharing user computer system 610 includes a media player 612 that may, for example, be embodied in a program module or an application resident in the computer system 610 that is configured to enable a user to access and consume pieces of media content provided by one or more of the media provider computer systems 620A, 620B, and 620C. In some implementations, the media player 612 that is used to access a given media provider is specific to that media provider such that different media providers have different associated media players 612 for accessing their respective media content. In other implementations, the same media player 612 is used to access the media of multiple or all of the media providers in the system 600.

The sharing user computer system 610 may further include a media sharing module 614 that works in concert with the media player 612 to enable the sharing user to share a piece of media content that the user is consuming through interactions with the media player 612 with other users. In some implementations, the media sharing module 614 is a sub-component or a plug-in within the media player 612 that provides additional functionality and user interface elements to the media player 612 that enable user sharing of media content. For example, the user interface elements added to the GUI of the media player 612 may be the graphical elements 140A and 140B shown in FIG. 1 and the graphical elements 540A and 540B shown in FIG. 5. The media sharing module 614 is configured to enable a sharing user to generate and send messages that include sharing links to receiving users. In some implementations, the media sharing module 614 generates API commands that are sent to a communications service application resident in the sharing user computer system 610 or in the communications service provider computer system 650 that instructs the application to generate and send messages with sharing links to a group of receiving users. A user of the computer system 610 also may access messages received from other users by, for example, launching and interacting with the communications service application.

The media sharing module 614 also may be configured to facilitate interactions between the computer system 610 and the intermediate server 640 when the sharing user is instead a receiving user that selects a sharing link in a received message. For example, the media sharing module 614 may store authentication credentials of the user of the computer system 610 for accessing the media sharing services offered by the intermediate server 640 such that these credentials may be supplied to the intermediate server 640 automatically and transparently to the user upon the user selecting a sharing link in a message. The media sharing module 614 also may facilitate access by the intermediate server 640 to the user's rights profile data store 616, which may be optionally included in the computer system 610. In some implementations, the media sharing module 614 includes all or most of the code used to display sharing pages (e.g., GUI 200 of FIG. 2), sharing receipt pages (e.g., GUI 300 of FIG. 3), and/or access options pages (e.g., GUI 400) with some or all of the specific data used to populate the pages being received from or through communications with the intermediate server 640.

The user rights profile data store 616 is a computer data store that is configured to store the user's rights profile. The user's rights profile may include information about the user and his or her access rights to multimedia content. The user's rights profile may include authentication credentials used by the user to access different media provider computer systems. As such, in some implementations, the user's rights profile may contain sensitive information that a user may prefer to have stored locally in the user's computer system rather than remotely by, for example, the intermediate server 640. Though, implementations are not limited to a particular location where the rights profile is stored, as the rights profile may be stored in any suitable location (e.g., a secure remote server, in a cloud-based system, in a removable storage medium, etc.). The information included in a user's rights profile is described in more detail below. In some implementations, the media sharing module 614 of the sharing user computer system 610 may periodically (e.g., hourly, daily, or at every power-up of the computer) or on a demand-basis (e.g., in response to a sharing event or upon the user launching a media player application) and autonomously from or in collaboration with the intermediate server 640 communicate with the multimedia provider computer systems to update the user's access rights information.

The media provider computer systems 620A, 620B and 620C are computer systems configured to enable users to access a repository or library of media content. Each media provider computer system may be specific to a particular media provider that offers its services to users. In some implementations, each media provider computer system provides its own media player to be used by the receiving and sharing user computer systems to access and consume media content provided by the media provider computer system. In some implementations, the media player is made available to users through use of a web browser application. The media provider computer systems may be configured to enable users to setup accounts with the media provider through a registration process, manage and process user payments for access to the media content provided by the media provider, and provide service-related communications to the users via the communication service provider system 650 or via a different communications service. Some or all of the media provider computer systems may require user authentication prior to enabling users to access media content managed or stored by the media provider computer systems. The intermediate server 640 may communicate with the media provider computer systems to acquire information about the access rights of users and about the collection of media content that the media provider computer systems make available to users.

In some implementations, the media provider computer systems 620A, 620B and 620C all share a same set of shared media content identifiers used for sharing transactions. Each of the media provider computer systems 620A, 620B and 620C, however, may associate a same shared media content identifier with a different shared media content URL that specifies the location where that particular piece of media content may be accessed from that particular media provider's library. Each of the media provider computer systems 620A, 620B and 620C may provide the corresponding shared media content URLs to the intermediate server 640 to allow these URLs to be related to the respective shared media content identifiers included in or specified by the URL of the sharing link used in the sharing transactions. The media provider computer systems 620A, 620B and 620C may each be a collection of computers that act collectively or individually to perform the above-noted functions.

The receiving user computer systems 630A and 630B are configured to enable users to access and consume media content that is shared with the users by a sharing user. The receiving user computer system 630A includes a media player 632A, a media sharing module 634A, and, optionally, a rights profile data store 636A. The receiving user computer system 630B includes a media player 632B, a media sharing module 634B and, optionally, a rights profile data store 636B. The media players 632A and 632B, the media sharing modules 634A and 634B, and the rights profile data stores 636A and 636B may, in some implementations, have the same functionality and be implemented in the same manner as described previously with respect to the media player 612, the media sharing module 614 and the rights profile 616, respectively. Moreover, the receiving user computer systems 630A and 630B may, in some implementations, each have the same functionality and be implemented in the same manner as described previously with respect to the sharing user computer system 610.

The intermediate server 640 is a computer system consisting of a single computer or a collection of computers that are individually or collectively configured to facilitate sharing of media content between users by communicating with receiving user computer systems and media provider communications systems to determine the access rights of users to shared media content. The receiving user computer system 630A or 630B may establish a communications session with the intermediate server 640 in response to, for example, the receiving user selecting a sharing link received by the receiving user in a message sent by a sharing user. During that communication session, the intermediate server 640 may receive a communication from the receiving computer system 630A that includes an identifier of the media content to be shared or that otherwise enables the intermediate server 640 to identify the media content to be shared. The intermediate server 640 may identify a set of access options available to the receiving user based on the identifier of the media content to be shared and based on the rights profile of the receiving user. The intermediate server 640 may communicate the access options to the receiving computer system 630A for display in a GUI such as, for example, GUI 300 of FIG. 3.

In some implementations, the user must authenticate himself or herself as a registered user of the media sharing services provided by the intermediate server 640 prior to being presented with an access options GUI, like GUI 300. The user may authenticate himself or herself by providing authentication credentials, such as, for example, a user identifier and a password. In some implementations, the user is presented with a login screen and the user may then manually input a user identifier and a password into a user identifier field and a password field of the login screen. In some implementations, the receiving user computer system 630A may automatically provide a stored user identifier and a password to the intermediate server 640 such that the user is automatically authenticated in a manner that is transparent to the user. In these implementations, the user is presented with the access options GUI immediately upon selecting the sharing link included in the message received from the sharing user.

If the user is not a registered user of media sharing services, the intermediate server 640 may present to the user a new account creation GUI with which the user may interact to create a media sharing account with the intermediate server 640. The new account creation GUI may prompt the user to input identifying information (e.g., full legal name, physical address and e-mail address) and to select a user identifier and a password to be used by the user to subsequently access the account with the intermediate server. In some implementations, the user identifier is automatically selected to be the same user identifier as that used by the communications service provider system 650 to identify the user (i.e., the same user identifier as that used by the communications service provider that sent the message from the sharing user to the user). In other implementations, the user identifier is a different user identifier from that used by the communications service provider 650 to identify the user. The user-inputted identifying information may be authenticated by, for example, the intermediate server 640 sending an authentication e-mail to the user's specified e-mail address that includes a user-selectable link that must be selected by the user to verify the user's identity. After the user-inputted identifying information has been authenticated, the intermediate server 640 may create a media sharing account for the user that enables the user to take advantage of the media sharing services offered by the intermediate server 640.

As part of the account setup process, the intermediate server 640 may present to the user an access rights GUI that prompts the user to identify the different media providers that provide the user with access to pieces of media content. For example, the user may indicate that he or she currently accesses media content from Media Provider A, Media Provider B, and his or her local cable television provider. In some implementations, the user may provide authentication credentials (e.g., a user identifier and a password) to the intermediate server 640 for some or all of the identified media providers. In some implementations, the intermediate server 640 may use the provided authentication credentials to access the computer systems of the respective media providers (e.g., computer systems 620A and 620B) on behalf of the user and to request or determine the user's access rights to the media content provided by the different media providers.

Media providers may offer users different levels of access (also referred to as access rights) to their library of media content. For example, some media providers may give a user the right to access all or a portion of their library of media content for free and may even give the user the right to access the content without requiring the user to setup an account with the media provider (e.g., YOUTUBE).

Some media providers allow users to select and purchase the different pieces of media content included in the media provider's library by interacting with a store interface (e.g., a web page store interface) in a manner that is the electronic equivalent of a user selecting and purchasing pieces of media content embodied in physical items (e.g., DVDs or CDs) from a brick and mortar store. These media providers provide the user with an ownership access right to the purchased pieces of media content that allows the user to subsequently log into their account with the media provider to obtain generally unfettered and repeated access to their purchased pieces of media content without requiring further payment from the user. The user is thereby able to create his or her own, personal library of media content that is maintained for the user by the media provider.

Some media providers allow users to select and rent different pieces of media content included in the media provider's library for a limited period of time (e.g., for 48 hours) or for a limited number of uses. These media providers may give the user access rights to the piece of media content for the rental period that are then rescinded after expiration of the rental period or that are rescinded after the user accesses the piece of media content a predetermined number of times.

Some media providers allow users to setup a subscription relationship with the media providers in order to access their library of media content (e.g., NETFLIX®). These media providers condition the right to access all or a portion of their library of media content on the user continuing to provide further compensation (e.g., payments) to the media provider over time. These media providers may setup an account for the user that enables the user to access the pieces of media content conditioned on the user continuing to provide the further compensation requested by the media provider. If the user has not provided the necessary compensation, the user's subscription may expire and, consequently, the user's right to access the pieces of media content may be rescinded. If desired, the user may resurrect an expired subscription at a later date by providing the appropriate compensation to have the user's access rights reinstated.

Some media providers enable users to store pieces of media content provided by the media provider locally on the user's own computer system (e.g., on the user's digital video recorder (DVR), on the hard-drive of the user's personal desktop or tablet/mobile computer, or in the memory of the user's Smartphone). In some implementations, the media provider allows users to enjoy an ownership interest with unfettered access rights to the locally stored pieces of media content. In some implementations, the media provider restricts the access rights to the locally stored pieces of content based, for example, on a subscription relationship or on a rental relationship.

Some media providers offer a combination of the above-described different access rights to their library of media content. For example, some media providers allow a user to purchase any piece of media in their library of content (e.g., the instant video store offered by AMAZON.COM), allow a user to access a portion of their library for free (e.g., kids shows, publicly funded educational shows, or promotional shows like infomercials), and allow a user to subscribe to access a different portion of their library (e.g., a "Prime" subscription membership offered by AMAZON.COM). Some media providers may only offer a single level of access to their library of media content. For example, some media providers do not allow users to purchase or rent pieces of media content but do allow users to get access to the pieces of media content in their library by setting up a subscription relationship with the media provider.

The intermediate server 640 may generate a rights profile for the user as part of the account setup process that may be stored in a data store that is local to the intermediate server 640 or that is remotely accessible to the intermediate server 640 across the data network 660. For example, the rights profile may be stored in the rights profile data store 636A, 636B of the receiving user computer system 630A, 630B and/or in a data store remote to both the receiving user computer system 630, 630B and the intermediate server 640.

In some implementations, the rights profile may include demographic information about the user (e.g., age) or security level information about the user that may be leveraged to modify the user's access rights as described previously. The rights profile also may include preferences selected by or for the user that identify the user's default access options for viewing shared content and preferences selected by or for the user that are used to automatically identify users that will receive shared content from the user. The rights profile also may include a group of media providers that the user has identified as being available to the user for the purpose of accessing shared media content and, for those media providers that require user authentication as a pre-condition to access, corresponding authentication credentials of the user.

In some implementations, the intermediate server 640 communicates with each media provider computer system and, if necessary, provides the user's authentication credentials to the media provider computer system in order to obtain specific information about the user's relationship with the media provider that is then stored in the user's rights profile. Since the user's relationships with different media providers may change over time, the intermediate server 640 (or the receiving user computer system) may update the rights profile information periodically (e.g., daily, weekly, or hourly) or on-demand (e.g., in response to and upon a user selecting a sharing link in a received message from a sharing user).

In some implementations, the information stored in the user's rights profile may indicate whether the user has a subscription relationship with the media provider and, if so, what type of subscription relationship (e.g., a premium subscription or a standard subscription). In some implementations, the intermediate server 640 (or the receiving user computer system) stores groups of shared media content identifiers corresponding to all of the pieces of content that a given media provider enables subscribing users to access for different subscriptions (e.g., a large group of content identifiers for a premium subscription with the media provider and a smaller group of content identifiers for a basic subscription). These groups of shared media content identifiers may be periodically updated by the intermediate server 640 (or by the receiving user computer system) periodically polling or otherwise communicating with the different media providers to identify the different pieces of media content that are accessible for different types of subscriptions.

In some implementations, the information stored in the user's rights profile includes shared media content identifiers of each of the pieces of content that the user has in his or her personal library with the media provider. The information also may include shared media content identifiers of each of the pieces of content that the user can currently access under a rental relationship with the media provider. The information also may include information that allows the intermediate server 640 to remotely access the local storage device of the user (e.g., DVR or computer hard drive) to determine what pieces of media content are available to be accessed by the user from local storage.

In some implementations, the intermediate server 640 determines the access rights of a receiving user to a particular piece of shared media by comparing the identity of the piece of media content to be shared with those identifiers that have been previously designated by the intermediate server 640 in the user's rights profile as being accessible to the receiving user through prior communications with media providers. If the identity of the piece of content to be shared is included in the list of identifiers previously designated by the intermediate server 640 for a particular media provider as being accessible to the receiving user, the intermediate server 640 may include in the offered set of access options an option to access the shared piece of media from the particular media provider.

In some implementations, the intermediate server 640 may determine the access rights of a receiving user to a particular piece of shared media by dynamically accessing some or all of the different media providers identified in the receiving user's rights profile in response to and upon receipt of a communication from the receiving user computer system 630A, 630B indicating that the receiving user has selected the sharing link in the message received from the sharing user. In these implementations the intermediate server 640 may use the authentication credentials of the receiving user to authenticate itself with a given media provider's computer system and may, thereby, collect information from the media provider's computer system that enables the intermediate server 640 to determine whether the user has access to the shared piece of media content from that provider on-the-fly. If the user does have access, a corresponding access option is included in the set of access options presented to the receiving user. Conversely, if the user does not have access, no such access option is included in the set of access options presented to the user.

In some implementations, the intermediate server 640 may identify access options for all versions or forms of the shared piece of media content for presentation to the user. In some implementations, the intermediate server 640 may restrict the set of available access options presented to the receiving user to a smaller set of access options based on user preferences as described previously with respect to FIGS. 3 and 4.

In some implementations, the intermediate server 640 identifies a single default access option to be used to access the shared piece of media content based on the user's default access option preferences and automatically sends a corresponding sharing URL that specifies the location of the shared piece of media content to the receiving user computer system 630A, 630B. The receiving user computer system 630A, 630B can then use the URL to automatically access the shared media content in a manner that is transparent to the receiving user. In other words, upon and in response to the receiving user selecting the sharing link in the message received from the sharing user, the receiving user is presented with a media player interface (e.g., the GUI 500) with which the user may interact to consume the shared media content.

The communications service provider computer system 650 is a computer system configured to enable users to communicate electronic messages with each other through the data network 660. The communications service provider computer system 650 may be any computer system that supports the generation and delivery of electronic messages between users that include links having associated URLs selectable to remotely access the intermediate server 640 across the data network 660. The communications service provider computer system 650 may operate in response to instructions provided by a communications application, which may be resident on the user's computer and/or on the computer system 650. In one implementation example, the communications service provider computer system 650 is a social networking computer system that enables users to send to each other messages having user-selectable sharing links that appear, for example, in the news feeds of the receiving users. In another implementation example, the communications service provider computer system 650 may be any one of an e-mail communications system, an instant messaging communications system, a text messaging communications system, and a unified messaging communications system.

Notably, while system 600 shows a single communications service provider system 650, other implementations may have multiple different communications service provider systems that support different types of messaging between users that each include respective links selectable to access shared media content through interactions with the intermediate server 640. For example, in some implementations, the system 600 includes an e-mail system, an instant messaging system, a text messaging system, and a social networking system that each enable sharing users to communicate messages having sharing links to receiving users that are selectable by the receiving users to access the same intermediate server 640.

The data network 660 is configured to enable electronic communication between two or more of the computer systems included in the communications system 600. The data network 660 may include a circuit-switched data network, a packet-switched data network, or any other network able to carry data, for example, Internet Protocol (IP)-based or asynchronous transfer mode (ATM)-based networks, including wired or wireless networks. The network 660 may be configured to handle web traffic such as hypertext transfer protocol (HTTP) traffic and hypertext markup language (HTML) traffic. The network 660 may include the Internet, Wide Area Networks (WANs), Local Area Networks (LANs), analog or digital wired and wireless networks (e.g., IEEE 802.11 networks, Public Switched Telephone Network (PSTN), Integrated Services Digital Network (ISDN), and Digital Subscriber Line (xDSL)), Third Generation (3G) or Fourth Generation (4G) mobile telecommunications networks, a wired Ethernet network, a private network such as an intranet, radio, television, cable, satellite, and/or any other delivery or tunneling mechanism for carrying data, or any appropriate combination of such networks.

Figure 7:
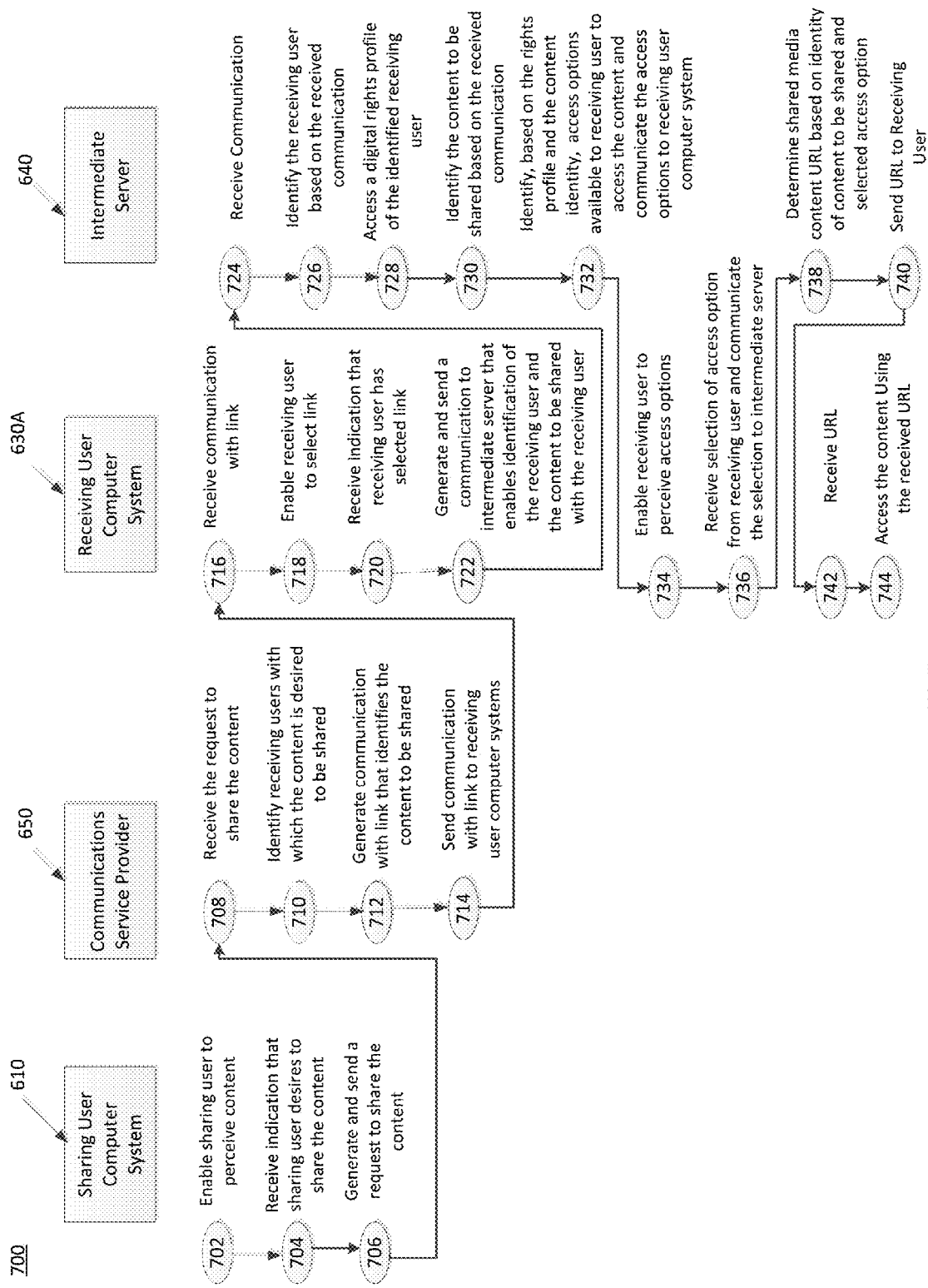
FIG. 7 is a flowchart illustrating operations performed by a media sharing communications system.

FIG. 7 is a flow diagram illustrating a process 700 for sharing media content between users. For convenience, the process 700 shown in FIG. 7 references particular componentry described with respect to FIG. 6. However, similar methodologies may be applied in other implementations where different componentry is used to define the structure of the system, or where the functionality is distributed differently among the components shown in FIG. 6.

The sharing user computer system 610 enables a sharing user to perceive content (702). As discussed previously, the content may be any type of media content and may be provided to the sharing user through a media player 612.

The sharing user computer system 610 receives an indication that the sharing user desires to share the content (704). This functionality may be provided by the media sharing module 614. The sharing user computer system 610 generates and sends a request to share the content (706). Again, this functionality may be provided by the media sharing module 614. In some implementations, the URL to be used in the media content sharing links included in the messages to be sent to receiving users is included in the request. The request is then sent to the communications service provider 650 for further action.

The communications service provider 650 receives the request to share the content from the sharing user computer system 610 (708). The communications service provider 650 identifies receiving users with which the content is to be shared (710). For example, the communications service provider 650 may be a social networking communications system and may identify the user's friends based on the user identifier of the sharing user.

The communications service provider 650 generates (712) and sends (714) a communication having a media content sharing link to each identified receiving user. For example, the communications service provider 650 may generate messages having sharing links that are then placed in the respective news feeds of each receiving user.

In other implementations, the communications application resident on the sharing user's computer system 610 performs operations 708, 710 and 712. In these implementations, the communications service provider system 650 merely receives the separate communications from the sharing user computer system 610 for each of the one or more receiving users and then routes each of the separate communications to their appropriate destination in the ordinary manner that it uses to route any communications (714).

The receiving user computer system 630A receives the communication with the sharing link (716) and enables the receiving user to perceive the communication and select the link (718). For example, the receiving user computer system 630A may receive the communication as a message to be included in the receiving user's news feed and may enable the receiving user to perceive the message in response to the receiving user accessing his or her news feed using a social networking application.

The receiving user computer system 630A receives an indication that the receiving user has selected the sharing link (720). In some implementations, the sharing link is displayed as an embedded hyperlink in message text. In other implementations, the sharing link is displayed as a graphical element, such as, for example, a graphical button, selectable to initiate a communications session with the intermediate server 640 to access the shared content.

In response to the indication that the receiving user selected the sharing link, the receiving user computer system 630A generates and sends a communication to the intermediate server 640 that enables identification of the receiving user and the content to be shared with the receiving user (722). The intermediate server 640 receives the communication (724) and identifies the receiving user based on the communication (726). In some implementations, a receiving user identifier is included in the communication that may be used by the intermediate server 640 to identify the receiving user.

The intermediate server 640 may access a digital rights profile of the identified receiving user (728). As illustrated in FIG. 6, this digital rights profile 636A may optionally be stored at the receiving user computer system 630A. In some implementations, it is additionally or alternatively stored at the intermediate server 640 or elsewhere on the cloud.

The intermediate server 640 identifies the content to be shared based on the received communication (730). In some implementations, a content identifier is included in the communication received from the receiving user computer system 630 that may be used by the intermediate server 640 to identify the shared media content.

The intermediate server 640 identifies, based on the rights profile and the content identifier, access options available to the receiving user to access the shared media content and communicates the access options to the receiving user computer system 630A (732). Each of the access options may be associated with a different shared media content URL that specifies the location where the corresponding shared media content may be accessed from a particular media provider's system.

The receiving user computer system 630A enables the receiving user to perceive the access options (734) and select an access option from the group of access options provided to the receiving user (736). For example, the receiving user computer system may present the GUI 300 of FIG. 3 to the receiving user and the receiving user may then select an access option by either selecting graphical element 340 or graphical element 350. Notably, if the user instead selects graphical element 360, the receiving user computer system 630A may present additional access options for selection via an interface similar to GUI 400 of FIG. 4. The presentation of the additional access options may, in some implementations, require further communications between the receiving user computer system 630A and the intermediate server 640 to identify the additional access options.

The receiving user computer system 630A communicates the selected access option to the intermediate server 640 and, in response to the communication, the intermediate server 640 generates or identifies a shared media content URL based on the identity of the content to be shared and the selected access option (738). The intermediate server 640 may then communicate the shared media content URL to the receiving user computer system 630A (740).

The receiving user computer system 630A receives the shared media content URL (742) and uses the shared media content URL to access the shared media content from the corresponding media provider computer system (744). For example, the receiving user computer system 630A may present to the user a media player GUI like that shown in FIGS. 1 and 5 with which the user may interact to perceive the shared media content.

In some implementations, the intermediate server 640 identifies a shared media content URL for each access option identified for the receiving user and sends the shared media content URLs to the receiving user computer system 630A along with the corresponding set of access options that will be presented to the receiving user for selection. In these implementations, operations 738 and 740 are not performed by the intermediate server 640 and the receiving user computer system 630A is able to access the shared media content by using the shared media content URL associated with the access option selected by the user.

Figure 8:
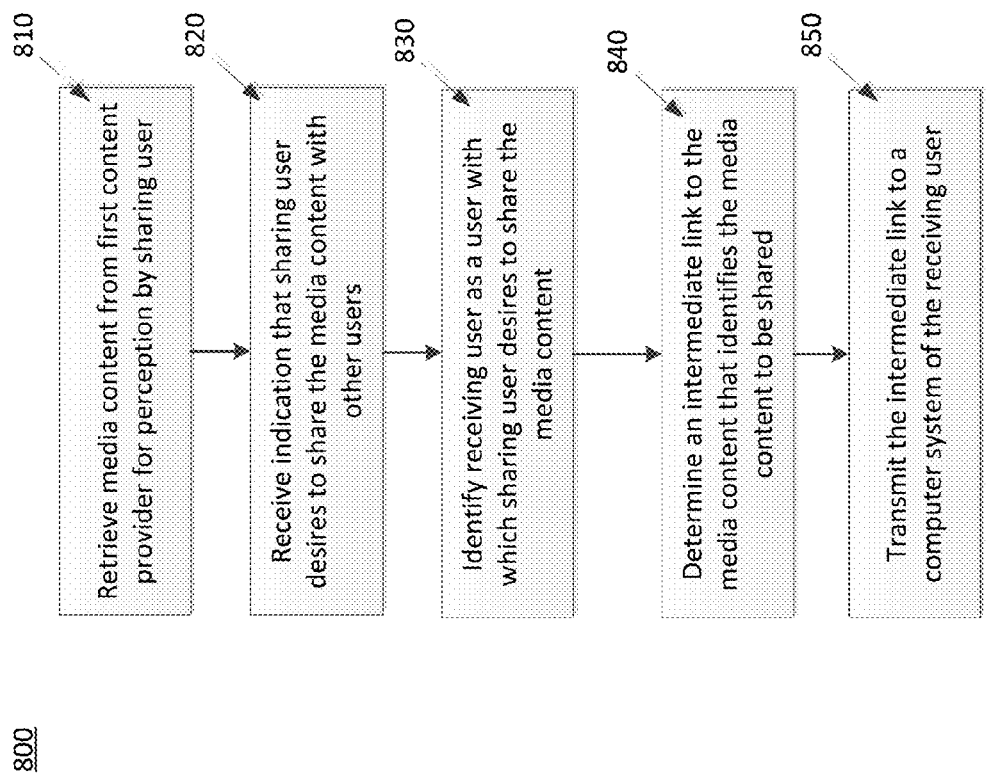
FIG. 8 is a flowchart of a process for choosing media content to share and communicating a link to the shared content to a receiving user.

FIG. 8 is a flowchart of a process 800 for choosing media content to be shared and sending a link to the shared media content to a receiving user. For convenience, the process 800 shown in FIG. 8 references particular componentry described with respect to FIG. 6. However, similar methodologies may be applied in other implementations where different componentry is used to define the structure of the system, or where the functionality is distributed differently among the components shown in FIG. 6.

Media content is retrieved from a first content provider system for perception by a sharing user (810). For example, sharing user computer system 610 may use media player 612 to retrieve content from content provider A 620A so that it may be played on media player 612. In some implementations, the sharing user computer system 610 retrieves a media player page specific to the piece of media that is being perceived by the sharing user by using a URL that is specific to the location of that particular piece of media in the computer system of content provider A 620A. In these implementations, each piece of media content may have its own specific media player page and associated URL.

An indication is received that sharing user desires to share the media content with other users (820). For example, the sharing user may provide input to media sharing module 614 that indicates that the sharing user wishes to share content by interfacing with a control provided in media player 612 (e.g., by selecting graphical elements 140A or 140B of GUI 100).

A receiving user is identified as a user with which the sharing user desires to share the media content (830). The receiving user may be identified, for example, by media sharing module 614, communications service provider 650, or a combination of the two. The receiving user also may by identified in an automated manner or in a manual manner using any of the previously described techniques, some of which may involve communications with the intermediate server 640.

An intermediate link that identifies the media content to be shared is determined (840). The intermediate link may be generated or determined, for example, by the media sharing module 614, the communications service provider 650, or a combination of the two. In some implementations, the shortened URL associated with the intermediate link is provided by the media provider computer system that served the media content to be shared to the sharing user as, for example, part of the data provided to the sharing user computer system 610 for displaying the corresponding media player page. In these implementations, the sharing module 614 may use the provided shortened URL for the intermediate link.

The intermediate link is transmitted to a computer system of the receiving user (850). The link, for example, may be included in a message (e.g., an e-mail, a news feed message, an instant message, or a text message) that is transmitted through the data network 660 to the receiving user computer system 630A.

Figure 9:
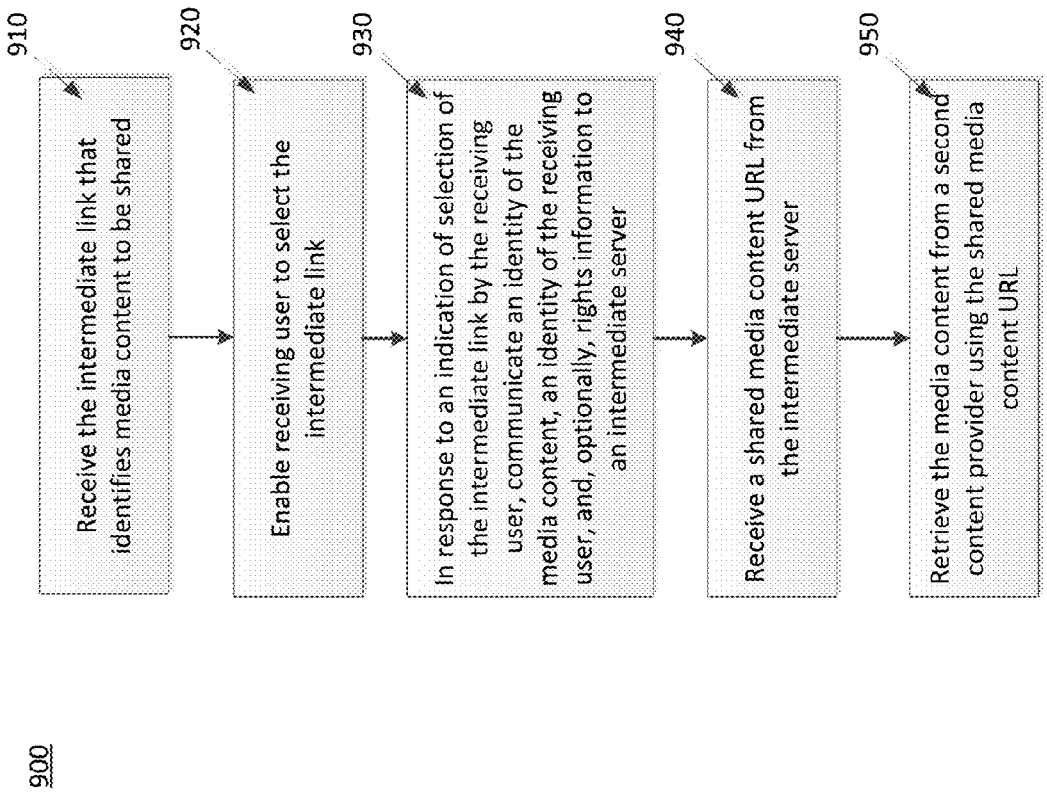
FIG. 9 is a flowchart of a process for receiving a link to shared media content and enabling a receiving user to retrieve the shared content using the link.

FIG. 9 is a flowchart of a process 900 for receiving a link to shared media content and enabling a receiving user to retrieve the shared content using the link. For convenience, the process 900 shown in FIG. 9 references particular componentry described with respect to FIG. 6. However, similar methodologies may be applied in other implementations where different componentry is used to define the structure of the system, or where the functionality is distributed differently among the components shown in FIG. 6.

The intermediate link that identifies media content to be shared is received (910). For example, the link may be received as part of a message (e.g., an e-mail, a news feed message, an instant message, or a text message) sent to the receiving user by the sharing user that the receiving user is able to access through use of the receiving user computer system 630A.

The receiving user is enabled to select the intermediate link (920). For example, the intermediate link may be presented as a hyperlink embedded in a text message having the shortened URL described previously.

In response to an indication of selection of the intermediate link by the receiving user, an identity of the media content, an identity of the receiving user and, optionally, rights information are communicated to an intermediate server (930). These pieces of information may be gathered by the media sharing module 634A, which may, in some implementations, access the rights profile 636A. The information may be sent to the intermediate server 640 in one or more messages that are sent to the intermediate server 640 during a data communications session setup through use of the shortened URL. As noted previously, in some implementations, the identity of the media content is included as part of the shortened URL used to access the intermediate server 640.

A shared media content URL is received from the intermediate server (940). The intermediate server 640 may determine the shared media content URL from the identity of the shared media content and the rights profile of the receiving user. The intermediate server 640 transmits the shared media content URL to the receiving user computer system 630A.

The media content is retrieved from a second content provider using the shared media content URL (950). For example, the receiving user computer system 630A may use media player 632A to directly access the content at content provider B 620B through use of the shared media content URL.

Figure 10:
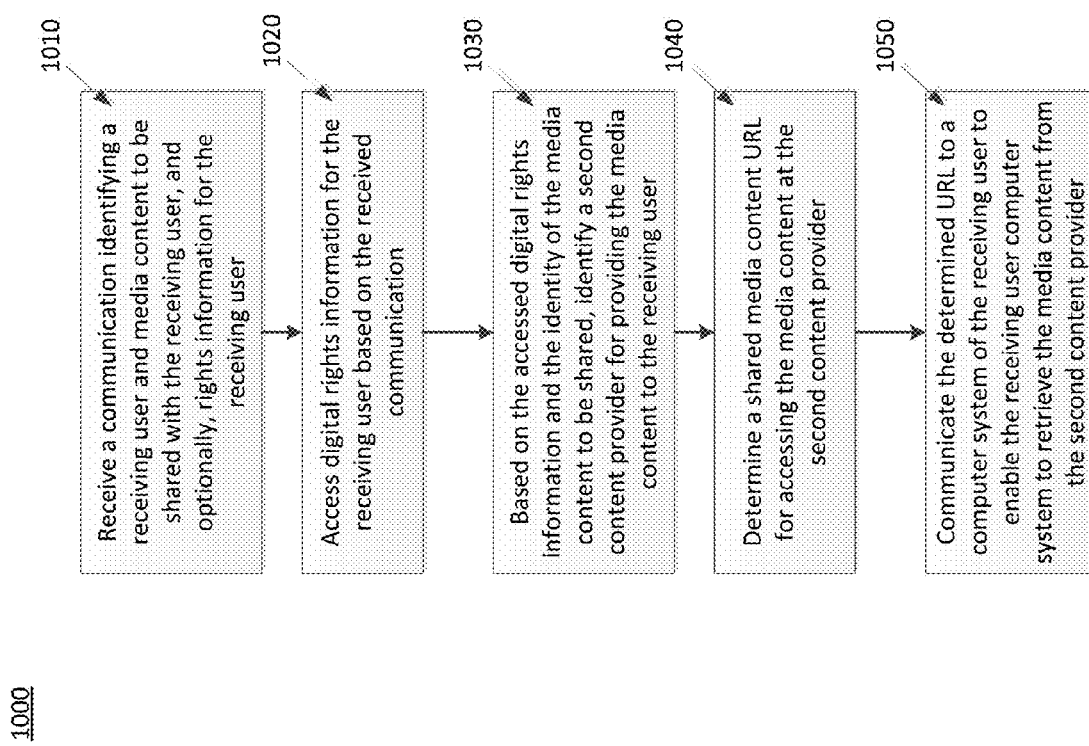
FIG. 10 is a flowchart of a process for providing access to shared media content to receiving user.

FIG. 10 is a flowchart of a process 1000 for providing access to shared media content to a receiving user. For convenience, the process 1000 shown in FIG. 10 references particular componentry described with respect to FIG. 6. However, similar methodologies may be applied in other implementations where different componentry is used to define the structure of the system, or where the functionality is distributed differently among the components shown in FIG. 6.

A communication identifying a receiving user and media content to be shared with the receiving user, and optionally, rights information for the receiving user is received (1010). This communication may be received by the intermediate server 640 during a communications session established between the receiving user computer system 630A and the intermediate server 640.

Digital rights information for the receiving user is accessed based on the received communication (1020). The intermediate server 640 may access the digital rights information from the rights profile 636A of the receiving user computer system 630A, from a data store local to the intermediate server 640, and/or from another cloud-based data repository.

Based on the accessed digital rights information and the identity of the media content to be shared, a second content provider for providing the media content to the receiving user is identified (1030). Intermediate server 640 may use the digital rights information from 1030 to identify a content provider (e.g., content provider B 620B) that can provide the shared media content to the receiving user. As described previously, the content provider may be identified using an automated default procedure or through user selection from among multiple available sources.

A shared media content URL for accessing the shared media content at the second content provider is determined (1040). In some implementations, the shared media content URL may include the identity of the content provider, such as content provider B 620B, as well as necessary parameters to establish attributes of the actual content to be provided.

The shared media content URL is communicated to a computer system of the receiving user to enable the receiving user computer system to retrieve the media content from the second content provider (1050). The intermediate server 640 may communicate the shared media content URL to the receiving user computer system 630A during the communications session that is setup between the intermediate server 640 and the receiving user computer system 630A. The receiving user computer system 630A can then play the content in the media player 632A using the shared media content URL.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations have been described. Other implementations are within the scope of the following claims.

What is claimed is:

1. A computer-implemented method, the method comprising:

retrieving media content from a first media content provider for access by a sharing user;

receiving an indication that the sharing user desires to share the media content with a receiving user;

determining an identity of the receiving user with whom the sharing user desires to share the media content;

sharing the media content by sending an intermediate link comprising a universal resource locator (URL) of an intermediate server and a media content identifier that identifies the media content to be shared to a computer system of the receiving user;

receiving an indication that the receiving user has selected the intermediate link;

communicating an identity of the media content and the identity of the receiving user to the intermediate server using the URL of the intermediate server specified in the intermediate link;

accessing, by the intermediate server, stored digital rights information of the receiving user;

obtaining, by the computer system of the receiving user and from the intermediate server, a first URL having been determined by the intermediate server based on the identity of the media content, the identity of the receiving user, and the digital rights information of the receiving user indicating an availability of the media content to the receiving user from a second media content provider, the first URL being different than the URL of the intermediate server; and in response to the indication that the receiving user has selected the intermediate link, retrieving the media content from the second media content provider using the first URL.

2. The method of claim 1, wherein the media content comprises one or more of: photos, images, music, audio, movies, television shows, video clips, applications, games, electronic documents, e-books, or e-magazines.

3. The method of claim 1, wherein sharing the media content by sending the intermediate link comprises sharing the media content by sending, to the receiving user, an electronic message that includes the intermediate link as an embedded hyperlink in message contents of the electronic message.

4. The method of claim 3, wherein the electronic message comprises one of an e-mail, an instant message, or a text message.

5. The method of claim 3, wherein the electronic message comprises a message included in a news feed provided to the receiving user by a social networking service provider.

6. The method of claim 1, wherein retrieving the media content from the first media content provider comprises a computer of the sharing user retrieving the media content by using a second URL to access the media content from the first media content provider.

7. The method of claim 6,
wherein the intermediate link is associated with a third URL, and
wherein the communicating of the identity of the media content and the identity of the receiving user to the intermediate server occurs through use of the third URL.

8. The method of claim 1, further comprising:
accessing the digital rights information for the receiving user;
determining a set of access options for accessing the media content available to the receiving user based on the digital rights information, the set of access options including an access option selectable to retrieve the media content from the second media content provider and an access option selectable to retrieve the media content from a third media content provider;
selecting an access option from among the access options in the set; and identifying the first URL based on the selected access option.

9. The method of claim 8, wherein selecting the access option from among the access options in the set comprises:
accessing default preferences for the receiving user, and
automatically selecting the access option based on the default preferences.

10. The method of claim 8, wherein selecting the access option from among the access options in the set comprises:
enabling the receiving user to perceive the set of access options, and
enabling the receiving user to manually select the access option from among the access options in the set.

11. The method of claim 1, wherein communicating the identity of the media content and the identity of the receiving user to the intermediate server comprises communicating the identity of the media content and the identity of the receiving user from the receiving user computer system to the intermediate server in response to the indication.

12. The method of claim 1, wherein sharing the media content by sending the intermediate link that identifies the media content to be shared to the computer system of the receiving user comprises:
determining a plurality of media content providers from which the media content is available;
determining, from among the plurality of media content providers and based on the digital rights information of the receiving user, a subset of media content providers from which the media content is accessible by the receiving user;
determining at least one intermediate link that corresponds to the subset of media content providers from which the media content is accessible by the receiving user; and
sharing the media content by sending the at least one intermediate link to the computer system of the receiving user.

13. The method of claim 1, further comprising:
accessing, by the intermediate server, stored digital rights information of a plurality of users;
determining, from among the plurality of users and based on the digital rights information of the plurality of users, a subset of users who are authorized to access the media content from at least one media content provider; and
sending, to a computer system of the sharing user, an indication of the subset of users who are authorized to access the media content from at least one media content provider,
wherein determining the identity of the receiving user with whom the sharing user desires to share the media content comprises determining the identity of the receiving user among the subset of users who are authorized to access the media content from the at least one media content provider.

14. A system comprising:
one or more computers and one or more storage devices storing instructions that are operable, when executed by the one or more computers, to cause the one or more computers to perform operations comprising:
retrieving media content from a first media content provider for access by a sharing user;
receiving an indication that the sharing user desires to share the media content with a receiving user;
determining an identity of the receiving user with whom the sharing user desires to share the media content;

sharing the media content by sending an intermediate link comprising a universal resource locator (URL) of an intermediate server and a media content identifier that identifies the media content to be shared to a computer system of the receiving user;

receiving an indication that the receiving user has selected the intermediate link;

communicating an identity of the media content and the identity of the receiving user to the intermediate server using the URL of the intermediate server specified in the intermediate link;

accessing, by the intermediate server, stored digital rights information of the receiving user;

obtaining, by the computer system of the receiving user and from the intermediate server, a first URL having been determined by the intermediate server based on the identity of the media content, the identity of the receiving user, and the digital rights information of the receiving user indicating an availability of the media content to the receiving user from a second media content provider, the first URL being different than the URL of the intermediate server; and in response to the indication that the receiving user has selected the intermediate link, retrieving the media content from the second media content provider using the first URL.

15. The system of claim 14, wherein the media content comprises one or more of: photos, images, music, audio, movies, television shows, video clips, applications, games, electronic documents, e-books, or e-magazines.

16. The system of claim 14, wherein sharing the media content by sending the intermediate link comprises sharing the media content by sending, to the receiving user, an electronic message that includes the intermediate link as an embedded hyperlink in message contents of the electronic message.

17. The system of claim 16, wherein the electronic message comprises one of an e-mail, an instant message, or a text message.

18. The system of claim 16, wherein the electronic message comprises a message included in a news feed provided to the receiving user by a social networking service provider.

19. The system of claim 14, wherein retrieving the media content from the first media content provider comprises a computer of the sharing user retrieving the media content by using a second URL to access the media content from the first media content provider.

20. The system of claim 19,
wherein the intermediate link is associated with a third URL, and
wherein the communicating of the identity of the media content and the identity of the receiving user to the intermediate server occurs through use of the third URL.

21. A computer-readable storage device storing software comprising instructions executable by one or more computers which, upon such execution, cause the one or more computers to perform operations comprising:

retrieving media content from a first media content provider for access by a sharing user;

receiving an indication that the sharing user desires to share the media content with a receiving user;

determining an identity of the receiving user with whom the sharing user desires to share the media content;

sharing the media content by sending an intermediate link comprising a universal resource locator (URL) of an intermediate server and a media content identifier that identifies the media content to be shared to a computer system of the receiving user;

receiving an indication that the receiving user has selected the intermediate link;

communicating an identity of the media content and the identity of the receiving user to the intermediate server using the URL of the intermediate server specified in the intermediate link;

accessing, by the intermediate server, stored digital rights information of the receiving user;

obtaining, by the computer system of the receiving user and from the intermediate server, a first URL having been determined by the intermediate server based on the identity of the media content, the identity of the receiving user, and the digital rights information of the receiving user indicating an availability of the media content to the receiving user from a second media content provider, the first URL being different than the URL of the intermediate server; and in response to the indication that the receiving user has selected the intermediate link, retrieving the media content from the second media content provider using the first URL.

22. The device of claim 21, wherein the media content comprises one or more of: photos, images, music, audio, movies, television shows, video clips, applications, games, electronic documents, e-books, or e-magazines.

23. The device of claim 21, wherein sharing the media content by sending the intermediate link comprises sharing the media content by sending, to the receiving user, an electronic message that includes the intermediate link as an embedded hyperlink in message contents of the electronic message.

24. The device of claim 23, wherein the electronic message comprises one of an e-mail, an instant message, or a text message.

25. The device of claim 23, wherein the electronic message comprises a message included in a news feed provided to the receiving user by a social networking service provider.

26. The device of claim 21, wherein retrieving the media content from the first media content provider comprises a computer of the sharing user retrieving the media content by using a second URL to access the media content from the first media content provider.

27. The device of claim 26,
wherein the intermediate link is associated with a third URL, and
wherein the communicating of the identity of the media content and the identity of the receiving user to the intermediate server occurs through use of the third URL.

* * * * *